May 8, 1945.　　　　　C. R. DOTY　　　　　2,375,293
TAPE CONTROLLED CARD PUNCHING MACHINE
Filed June 3, 1944　　　21 Sheets-Sheet 1

May 8, 1945.  C. R. DOTY  2,375,293
TAPE CONTROLLED CARD PUNCHING MACHINE
Filed June 3, 1944  21 Sheets-Sheet 3

INVENTOR
Charles R. Doty
BY
ATTORNEY

May 8, 1945.                    C. R. DOTY                    2,375,293
                    TAPE CONTROLLED CARD PUNCHING MACHINE
                    Filed June 3, 1944           21 Sheets-Sheet 5

INVENTOR
Charles R. Doty
BY
ATTORNEY

May 8, 1945.  C. R. DOTY  2,375,293
TAPE CONTROLLED CARD PUNCHING MACHINE
Filed June 3, 1944   21 Sheets-Sheet 6

INVENTOR
Charles R. Doty
BY
ATTORNEY

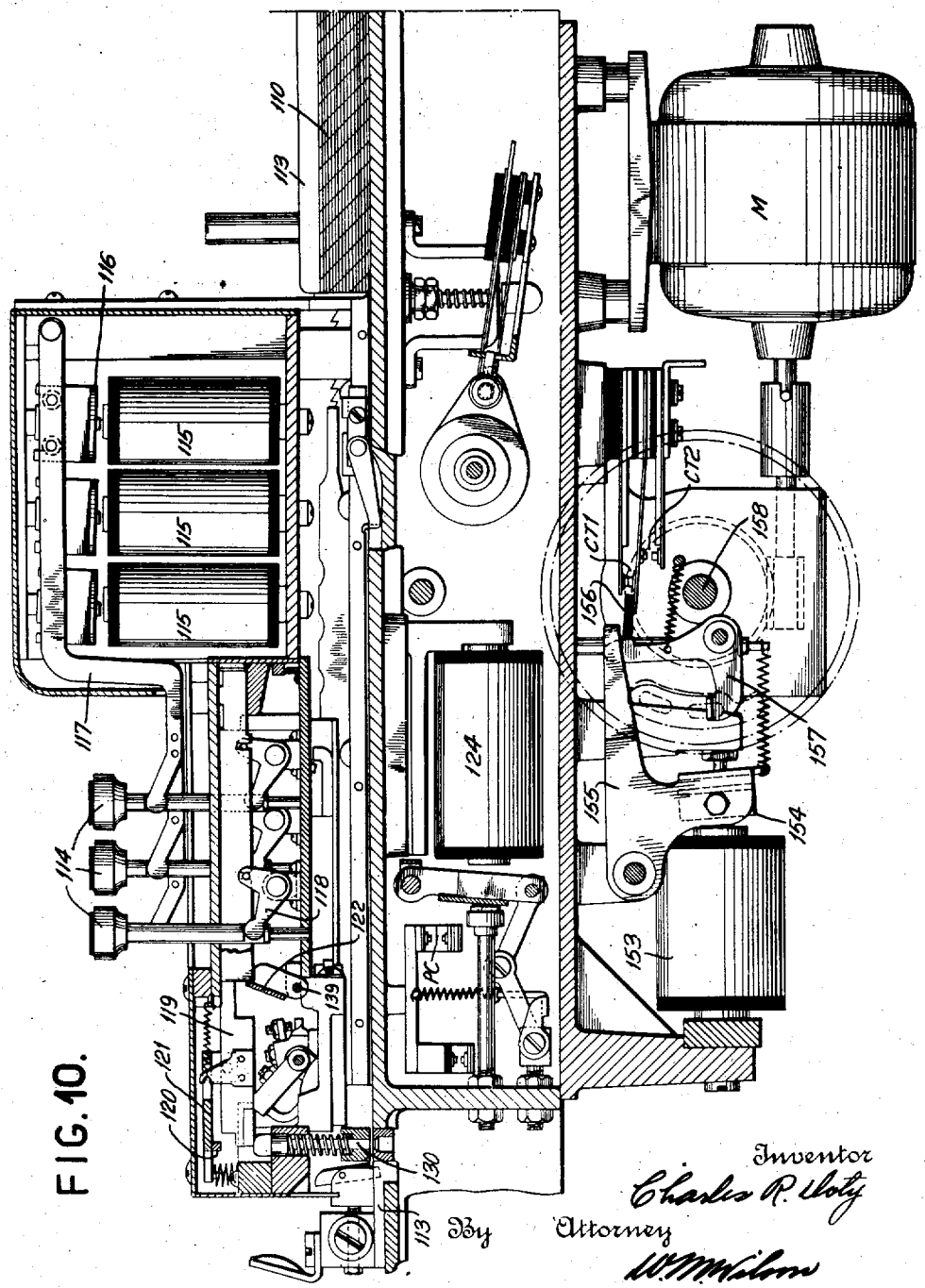

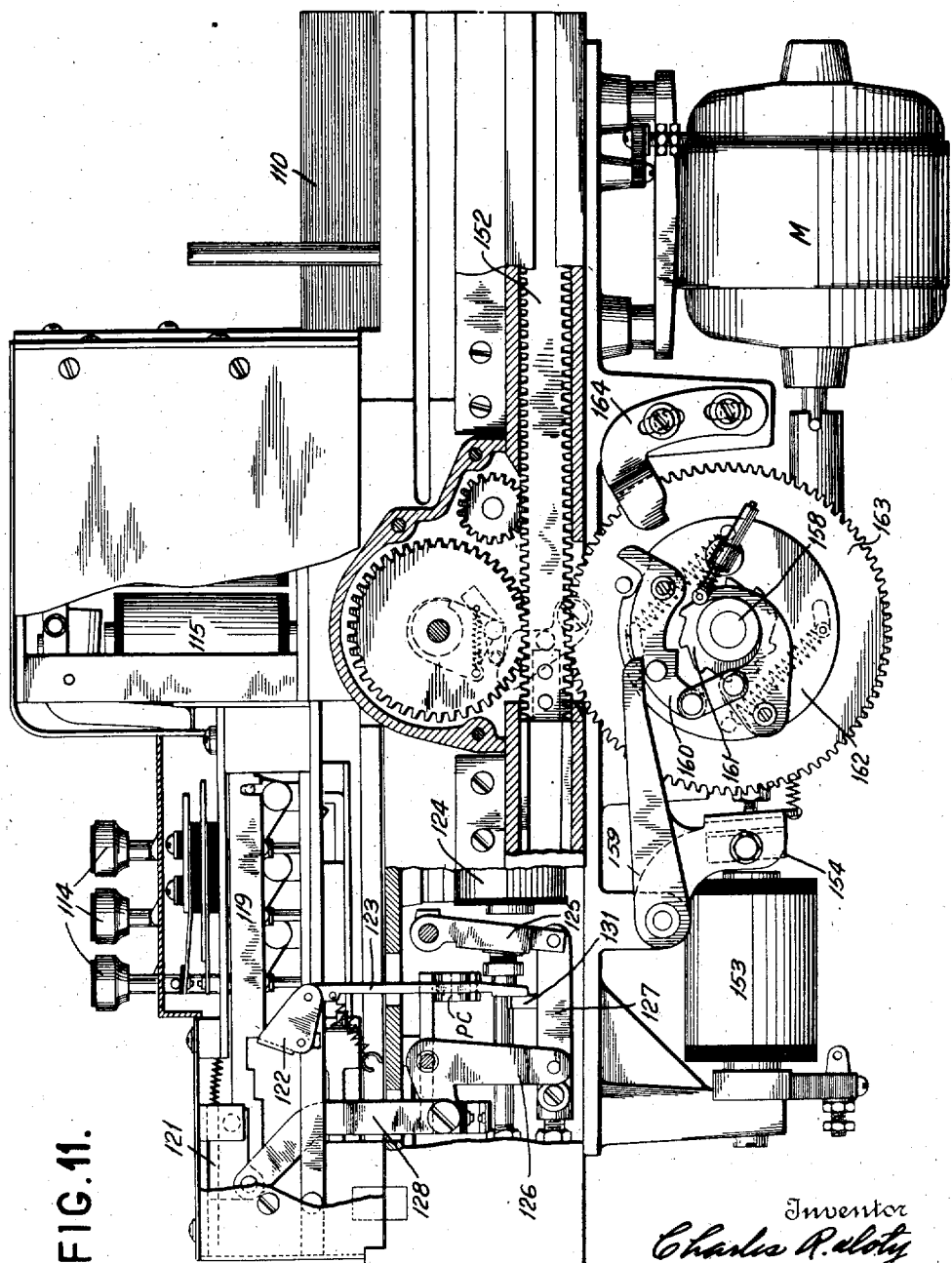

May 8, 1945. C. R. DOTY 2,375,293
TAPE CONTROLLED CARD PUNCHING MACHINE
Filed June 3, 1944 21 Sheets-Sheet 9

Inventor
Charles R. Doty
By Attorney

May 8, 1945.   C. R. DOTY   2,375,293
TAPE CONTROLLED CARD PUNCHING MACHINE
Filed June 3, 1944   21 Sheets-Sheet 19

INVENTOR
CHARLES R. DOTY.
BY
ATTORNEY.

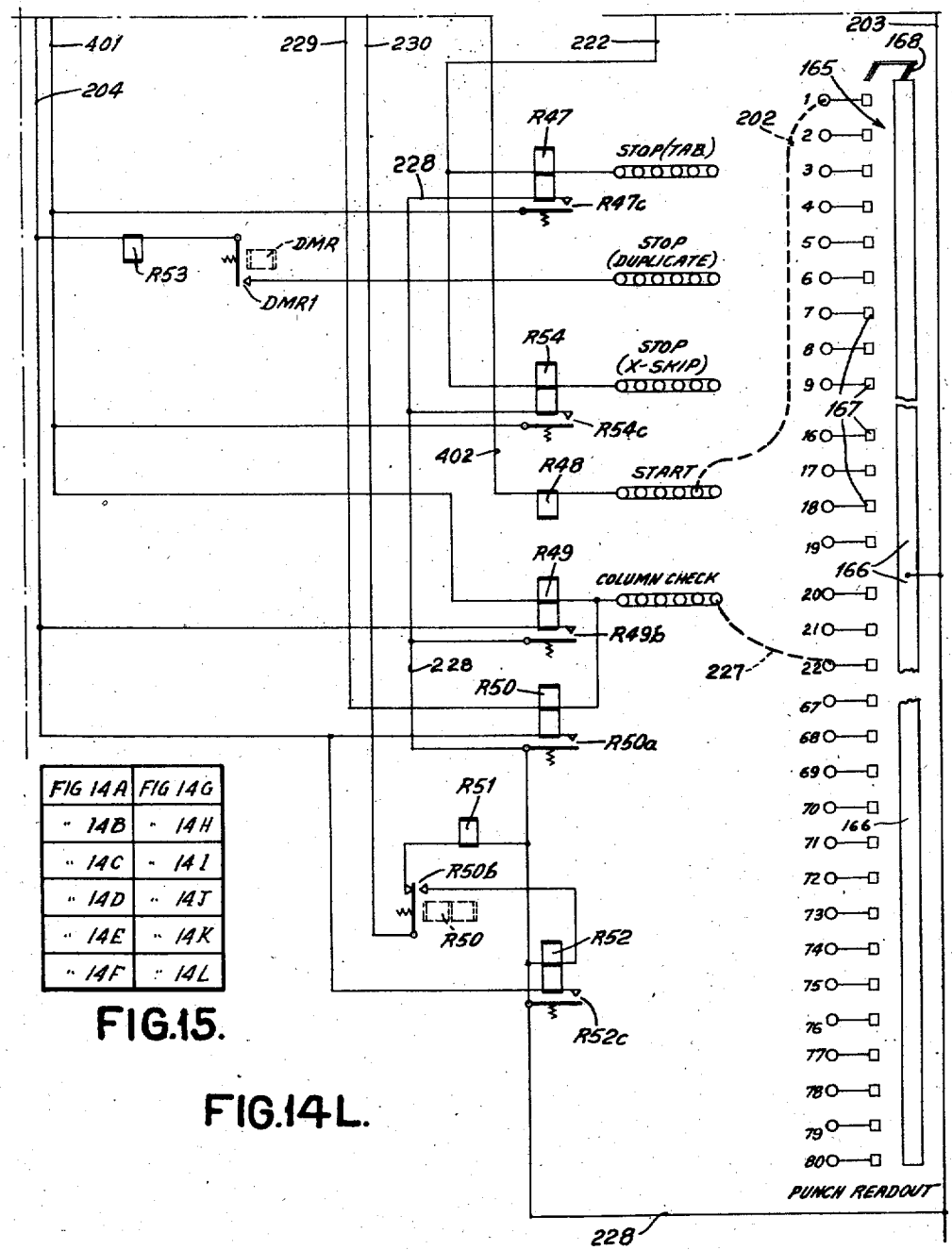

Patented May 8, 1945

2,375,293

UNITED STATES PATENT OFFICE 2,375,293

TAPE CONTROLLED CARD PUNCHING MACHINE

Charles R. Doty, Yonkers, N. Y., assignor to International Business Machines Corporation, New York, N. Y., a corporation of New York Application June 3, 1944, Serial No. 538,584

50 Claims. (Cl. 164—115)

This invention relates to a tape controlled record perforating apparatus and more particularly to the type of apparatus which provides for the sensing of coded data representing designations on a tape arranged according to a telegraphic code, converting such coded designations to another code such as a statistical code and effecting the representation of such data by perforations arranged according to a statistical code on a statistical card.

Machines of such a character have been previously devised, as exemplified in Patent No. 2,340,801, issued to C. R. Doty and E. J. Rabenda on February 1, 1944.

The present invention is directed to the provision of a plurality of card perforating machines and further, a selective control for such plurality of machines whereby the telegraphic coded data sensed on the tape may be reproduced in statistical code in desired fields of the cards of both machines; selectively in a desired field of the card in any desired machine, or entirely suppressed with respect to the cards in both machines.

The wide flexibility of the selective control embodied in the present invention provides for the segregation and sub-division of character representing data, or its suppression on statistical cards enabling the cards to be then used as a control for statistical tabulating machine to give lists of data segregated in the desired manner.

The principal object of the invention is the provision of a plurality of tape controlled character recording machines, such as card perforating machines, typewriters and the like, and an associated programming means for effecting the segregation of the data recorded by the recording machines.

A more specific object of the invention is the provision of a programming means which consists of a tape perforated at column positions preferably interspersed with the coded character designations which function for the purpose of transmitting signals to effect the starting and stopping of the perforating machines.

Another object of the invention and primary in order is the provision of a selective control for a tape controlled machine which consists of coded designations on a tape which includes one of the coded designations representing a character which can be designated on a card under control of the tape.

More specifically it is an object of the present invention to provide a control means for a recording machine which is responsive to the sensing of a particular signal represented on the tape and transmitted under control thereof, and which control means has the function of initiating recording operations under control of the tape or, if said recording operations were previously initiated, to then suppress further recording operations.

Another object of the invention is the provision of a plurality of selectively controlled tape controlled recording machines, such as card perforating machines, typewriters and the like which are selectively called into action prior to the sensing of coded character designations on the tape to enable the segregation of data by causing the recording to be effected on desired sheets.

Another object of the invention is to provide a selective control means for a plurality of recording machines responsive to coded signals on a tape which are interspersed with the coded character representing designations to determine at will the operation or non-operation of the desired recording machine.

A more specific object of the invention is to enable such coded signals to consist of or be included as one of the coded character representing designations and further means which prevents the selected recording machine from operating in a character designating way by rendering the recording machine non-responsive to the transmission of such coded signals.

In connection with the preceding object, it is a further object of the invention to enable such coded designations to function in the selected recording machine in the usual way for character designation after a recording machine has been selected for operation.

Associated with the preceding object is another feature of the invention which consists of a selecting means for a tape controlled character recording machine which is responsive to a "start" operating signal on a tape and which maintains the associated recording machine effective for recording under control of the subsequently sensed tape until a "stop" signal on the tape is sensed.

For the plurality of recording machines the preferred form of signal-controlled selecting means causes the plurality of recording machines to be selectively conditioned for common recording upon the successive transmission of two distinct "start" signals and then the transmission of another "stop" signal after the recording operation which inhibits the operation of either recording machine, thus enabling the other to continue with its recording operation.

Accordingly, with one or a plurality of recording machines in operation the successive transmission of the appropriate "stop" signals will inhibit further recording, enabling idle tape sensing operations without designation of further used data by the recording machines, until the recording machines are again selected for operation by the receipt of an appropriate signal.

A further object which resides particularly in the translating or code converting arrangement which is preferably utilized herein, is the association of duplex code translating and converting mechanism, one for each recording machine, with a common tape sensing unit, and control means responsive to the transmission of tape derived signals for rendering the code translating and converting mechanism associated with a selected recording machine effective for its purpose.

A still further object, particularly in relation to the code translating and converting arrangement is the incorporation of a control means for initiating the operation of or suppression of the recording machines to form part of, or to be included in the code translating and converting arrangement. Such feature of the invention enables the control means to be responsive to a signal, such as figures case M, for connecting the recording machine for operation, and then responsive to another signal, such as figures case N, to stop the operation of the machine.

In connection with the latter, it is well known that in the type of machine used as the preferred embodiment "figures," key signals or codes are perforated on the tape preceding the character designating perforations to indicate that the following data consists of numerical data. A feature of the invention is to condition the recording selecting control means so that they are responsive to following coded signals, whether such signals are for the purpose of initiating the operation of the recording machine, or for suppressing its operation.

In the specific embodiment of the invention it is preferable to use punctuation as the signals for selecting the recording machines for operation or for suppressing their operation and to this end the "figures" key code which precede coded designations on the tape conditions the code translating and converting mechanism to be responsive to the character representing signals for the purpose of selecting the appropriate punch selecting circuit but ineffective upon the control means for recording machine initiation or suppression.

The specific embodiment to be described in detail hereinafter serves merely as one illustrative form of the invention, and comprises a suitable telegraphic tape reader or sensing unit whereby the transverse columns of key and data designations are presented successively, step by step, to the individual sensing elements. Associated with each punch are groups of translating code converting and distributing relays which are selectively controlled by the sensing elements but which are ineffective for translating or converting the telegraphic Baudot code to the Hollerith code until the related punch has been selected for operation. When such translating and distributing relays are rendered effective upon the selection of the related punch they control selectively the energization of the card punch magnets so that alphabetical and numerical data sensed on the tape are recorded in statistical code on the cards. "Letters" and "figures" control circuits are provided and are controlled selectively under the influence of the sensing elements for supervising the conditioning of the card punch control circuits (controlled by said translating and distributing relays) whereby the key code designations per se exercise no controlling effects on the punch magnets, but cause proper operations of the punch elements in accordance with the immediate subsequently analyzed character designations associated with their representative key code designations. In the instant case the "letters" or "figures" supervisory control means are maintained effective, until the other key code designation is effective to control its related supervisory means.

In the instant case "figures" supervisory circuits condition the code converting and translating means of each punching machine to be selectively responsive to the receipt of distinct signals to initiate or suppress operation of the related punch. The "letters" supervisory circuits conditions the circuits so that when coded designations are sensed on the tape which are preferably utilized as the start and stop signals for the recording machines, they will not function in this manner but will enable the usual controlling effect in the punch magnet circuits. Under control of a punch column readout device for each punching machine additional circuits are provided, which function as a means for checking all the functional operations of the tape sensing and card punching units to determine whether their operations are terminated in unison upon completion of each card punching cycle by utilizing the "carriage return" and "line feed" code designations as checking signals. Further control circuits controlled by the readout device for each punch insures the initial cyclic operation of the tape sensing unit only when the carriages of both recording machines are at their initial column position.

As previously intimated, for the purpose of illustration the present embodiment utilizes a recording machine of the column by column card punching type which form of recording is analogous to other recording machines, such as typewriters and the like. Hence, it is apparent that the present invention is not limited in its embodiment to the specific form of recording machine herein shown and equivalent recording structures may be substituted therefor without deviating from the spirit of the invention. It is further understood that the provision of the code translating and converting mechanisms herein shown is simply for the purpose of converting telegraphic coded designations to a statistical code and it is within the invention to devise the present novel combination without the employment of such translating and converting mechanisms. In some requirements the conversion of designations from one code to another may not be required and the consistent adoption and maintenance of the same code from the initial transmission to the recording operation will enable the present invention to be utilized without departing from the spirit of the invention.

Other objects of the invention will be pointed out in the following description and claims and illustrated in the accompanying drawings, which disclose, by way of example, the principle of the invention and the best mode, which has been contemplated, of applying that principle.

In the drawings:

Fig. 7 shows a tape portion showing the telegraphic code employed herein.

Fig. 7A is a fragmentary section of a telegraphic tape bearing an exemplary message.

Figs. 7B and 7C are fragmentary portions of statistical cards, both punched to represent common information derived from the tape of Fig. 7A and each punched to receive selective data such as —890— for the card of Fig. 7B and —567— for the card of Fig. 7C. Suppression of both punches prevents the number —143— on the tape of Fig. 7A from being recorded on either card.

Fig. 10 is a sectional view illustrating details of construction of the record card perforating unit.

Fig. 11 is a sectional view, similar to Fig. 10, but taken on a section line further to the front of the perforating unit.

Figs. 14A to 14L when arranged as indicated in Fig. 15 (on sheet with Fig. 14L) provide a diagram of circuit connections of the apparatus.

1. *General description*

The punching units and tape sensing unit shown herein are, for illustrative purposes, of the same construction as the type fully shown and described in the patent to C. R. Doty et al., No. 2,340,801, granted February 1, 1944. Reference may be had to this patent for a complete description of the construction and operation of the units involved herein.

Figure 9:
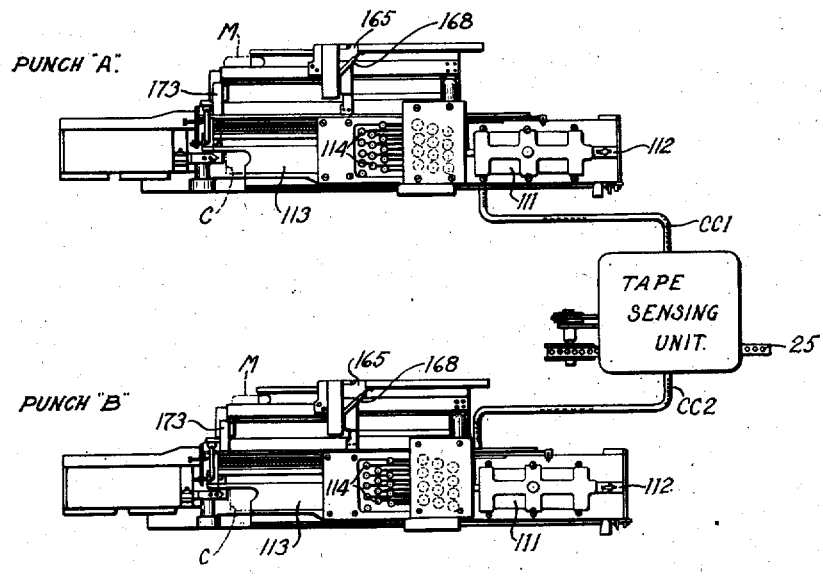
Fig. 9 is a plan view of the two record card perforating units A and B and diagrammatically showing the electrically connected tape sensing unit.

Before describing in detail the commonly utilized tape sensing unit and the coordinated plurality of record perforating units, which are shown electrically connected in Fig. 9, by cable connections CC1 and CC2, a general outline of the functional operations thereof will be set forth briefly, and the translating mechanism referred to may be the one provided for punch "A" or punch "B", since they are duplicates of each other.

The telegraphic tape 25 is advanced one step, for each punching cycle of the apparatus whether the A or B, or both punches are operated, or advanced step by step without punching cycles, for successively presenting the transverse rows of key and character code perforations to the cyclically operable sensing pins 50. Sensing contacts 52, controlled by pins 50, are operated in different code combinations in accordance with the information sensed on the tape. The sensing contacts are connected to different translating relays of the group R3—R11 (see Fig. 14A), which relays selectively control the operations of the groups of translating relay contacts (Figs. 14B and 14C for punch A and, Fig. 14H and Fig. 14I for punch B) which are connected in a pyramidical arrangement. Selective operations of different code groups of the connected translating relay contacts control the selections of individual distributing relays of the group R12—R42 for either the A punch or the B punch. The distributing relay contacts (see the "b" and "c" contacts, Figs. 14D, 14E for punch A, and 14K and 14L for punch B) are connected, in a predetermined arrangement, to the individual conductors of the related group 208—219, which conductors, in turn, are connected to the so-called punch selecting magnets 115 (Fig. 14A) of the A card punch unit, or of the B card punch (Fig. 14G). The said translating and distributing relays, and their associated contacts, are effective to translate or convert the data designations sensed in the five-unit telegraphic code to the statistical code, and accordingly control selectively the energization of the punch selecting magnets of the selected punch, thereby causing the code designating perforation representing the sensed data to be punched in the statistical record cards in the A punching machine, the B punching machine, or both.

In order to distinguish properly, whether the sensed code designations in the telegraphic tape belong to the alphabetical or numerical group, supervisory circuits are provided for each punch which are under control of the sensing contacts 52, and are selectively and automatically conditioned upon sensing the "letters" or "figures" key code designations preceding the related character code designations. The "figures" relays R43—R46 (Fig. 14D and Fig. 14J) are included in the said supervisory circuits, the contacts of which are effective to condition the circuits connected to the related distributing relay contacts, in such a manner, that the punch selecting magnets 115 of the selected punch are controlled to perforate the record cards in the numerical or alphabetical statistical code designations in accordance with the subsequently analyzed telegraphic character designations. It is to be understood, in the instant case, that whenever two rows of code groups of perforations on the telegraphic tape relate to the same group of characters, namely, the numerical or alphabetical group, a single key signal preceding a group of successive code designations representing characters of the same group is sufficient. Accordingly, the translating circuits for each punch are conditioned, under the influence of the "figures" or "letters" key code designations, and are maintained in this condition so long as the subsequently analyzed character designations belong to the same character group. Upon sensing a change in the key code, correspondingly appropriate conditioning of the translating circuits is effected and maintained accordingly. In addition thereto, the translating circuits are arranged and controlled so that the sensed key code designations per se are not capable of effecting energization of the punch selecting magnets 115, or advancing the card carriage of either punch A or B from one column position to another.

Each punch unit A or B is provided with a readout device 165 (see Figs. 9, 14F and 14L) for automatically controlling the starting and stopping operations of the tape sensing unit. Relay control means, such as relays R47, R48, R53 and R54 (Fig. 14F or Fig. 14L), are associated with the said readout device, and automatically cause the sensing operations to be suspended, during predetermined functional operations of the punch unit, such as card ejection and carriage return operations, tabulating and duplicating operations, and thereafter, upon completion of such operations, automatically cause the sensing operations to be renewed. All of these operations are fully described in Patent No. 2,340,801. Relay control means, such as relays R49—R52, are also provided and cooperate with certain of the said distributing relays and readout device for utilizing the "carriage return" and "line feed" signals sensed on the telegraphic tape for determining and checking whether all the functional operations of the sensing and both punching units were completed in unison, upon the completion of each cycle of operation of each punch unit. A punch unit or card cycle, in the instant case, refers to the period of operation of the punch unit, whereby a blank card is fed from the hopper to the different columnar positions to receive all the data designating perforations, and then positioned to the last column ready for ejection purposes.

2. Telegraphic control tape

Referring now to Fig. 7, a tape 25 is shown provided with successive transverse rows of perforations 27 arranged in accordance with the well-known five-unit telegraphic code, usually referred to as the Baudot or Teletype permutative code. In a five-unit code system only thirty-two possible permutations are available, and, as mentioned hereinabove, for this reason, it is necessary to employ the same code combinations to represent the alphabetical characters, the numerical and other designation characters, and also desirable herein to utilize the alphabetic characters as control designations for determining the operation or non-operation of both punch units.

In order to distinguish the alphabetical characters from the other remaining characters, for telegraphic transmission purposes, the alphabetical signals or code designations are always preceded by a "letter shift" signal or code designation, and the other remaining character signals or code designations are preceded by a "figure shift" signal or code designation. Whenever, it is desired, in the telegraphic printed copies, to have spaces appear thereon, it is necessary to insert "space" code designations in the perforated tape. For example, in the perforated tape shown in Fig. 7A, the indicated code perforations are arranged so as to designate 123JOHN JONES 567 890 123 456; which arrangement of code designations in the perforated tape is necessary when the tape is employed for controlling the known types of printing telegraph apparatus. The usual smaller feed perforations 26 are also shown to be provided in the tape 25, as well as the "carriage return" and "line feed" perforations which are provided at the end of each line of information.

3. Tape sensing unit

Figure 1:
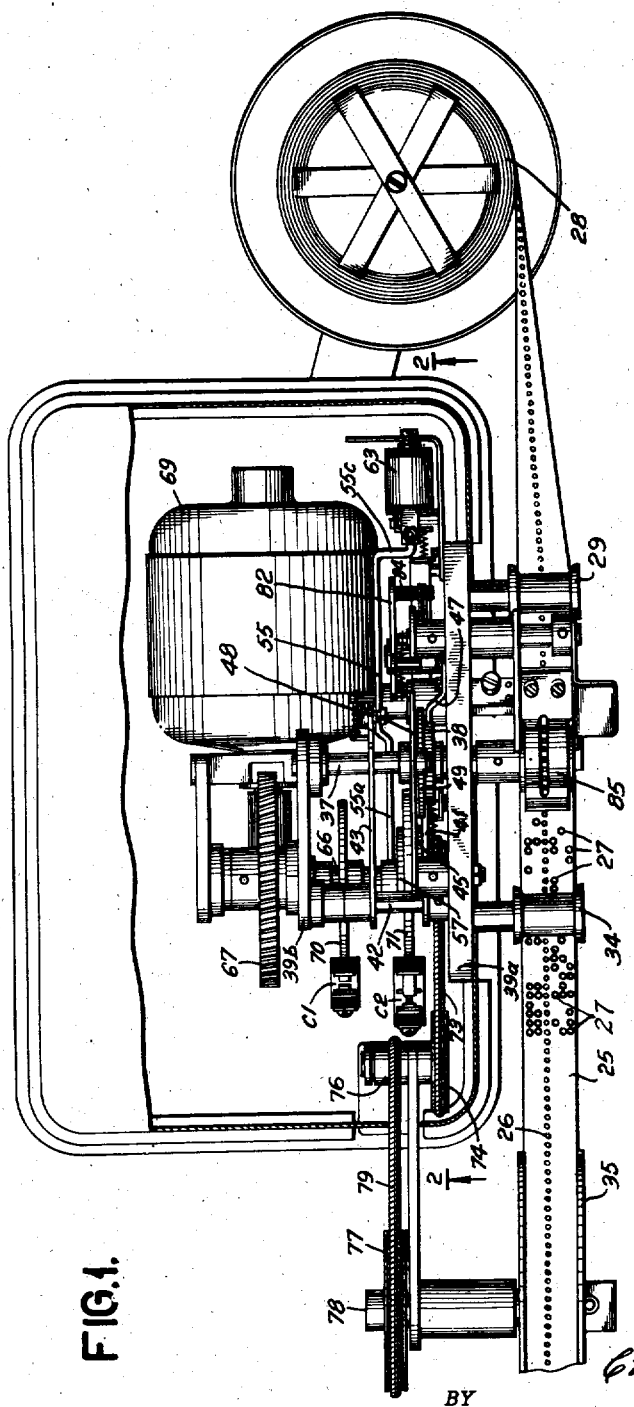
Fig. 1 is a plan view of the telegraphic tape sensing unit.
Figure 2:
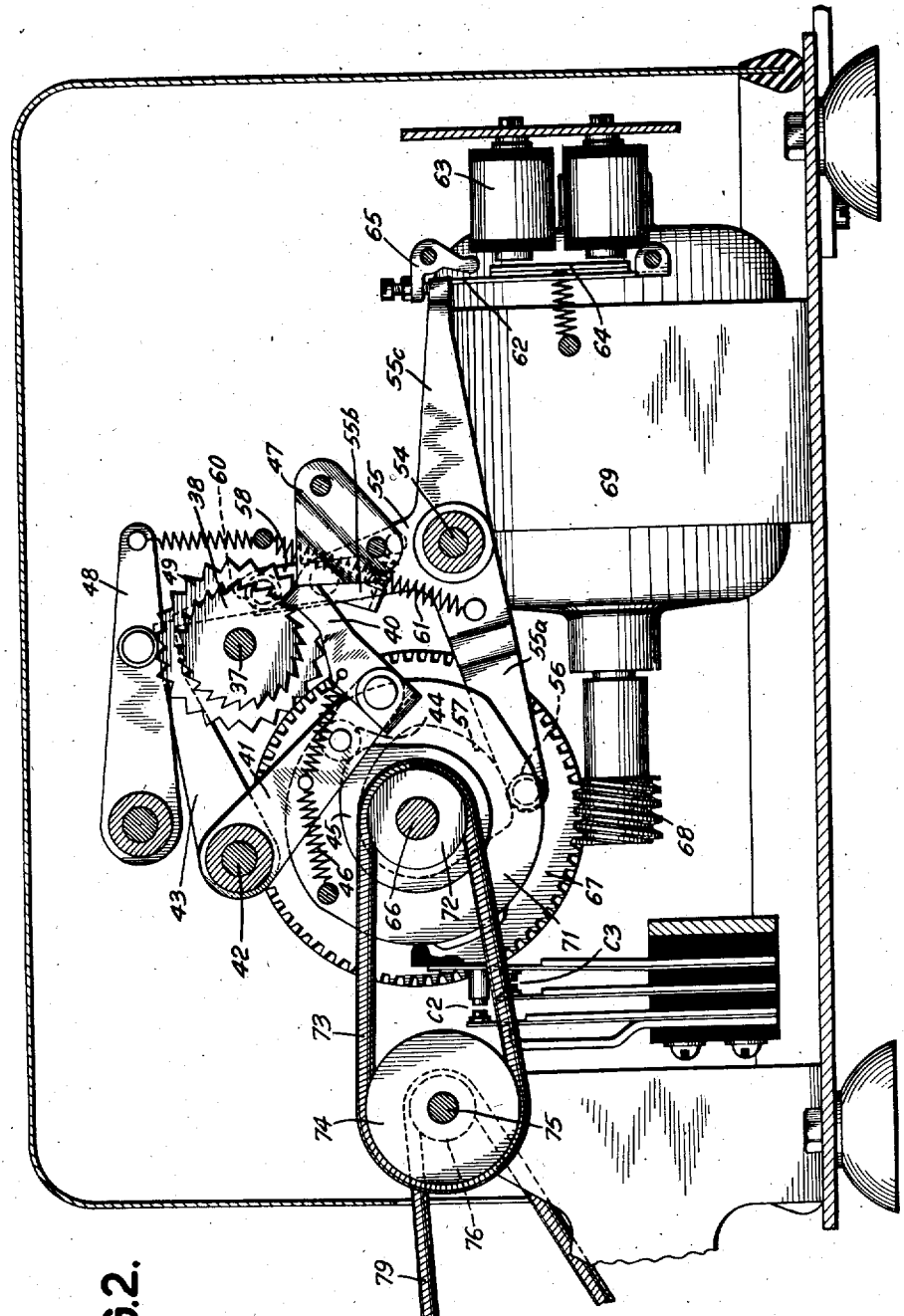
Fig. 2 is a sectional view taken along lines 2—2 of Fig. 1.
Figure 3:
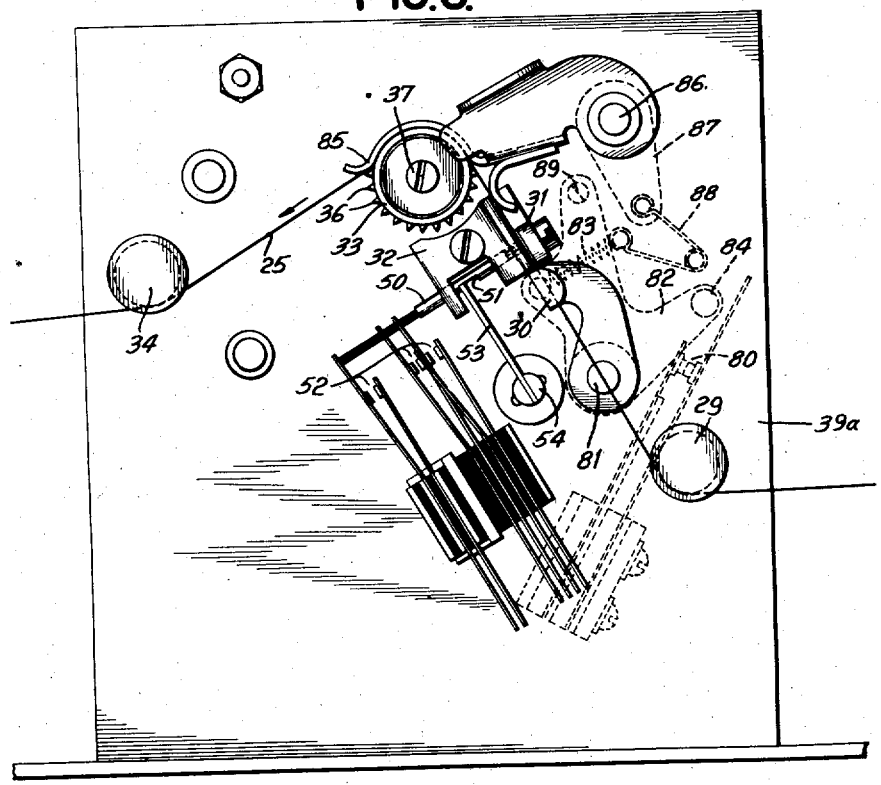
Fig. 3 is a front elevational view of the tape sensing elements.

Referring now to Figs. 1 and 3, the telegraphic tape 25, provided with the feed perforations 26 and combinational code perforations 27, is fed from a supply roll 28 under a guide post 29, over a tape guide arm 30, between a pair of separated blocks 31 and 32, over a sprocket wheel 33, and under a guide post 34 to a take-up reel 35. Sprocket wheel 33 is provided with the usual centrally located periphery teeth 36 for engaging the feed perforations 26 and feeding the tape in the direction shown by the arrow in Fig. 3. The said sprocket wheel is mounted on a shaft 37, suitably supported by side plate 39a and intermediate plate 39b, to which shaft ratchet wheel 38 is secured. Ratchet wheel 38 is rotated, step by step, by a spring urged pawl 40 (Fig. 2) pivotally mounted on a cam follower arm 41, the latter being secured to shaft 42 (supported by the said side and intermediate plates). Also secured to shaft 42 is a latch arm 43, which when released permits a cam roller 44, carried by the cam follower arm 41, to ride on the periphery of a constantly rotated cam 45, and follow the contour of the latter. The contour of cam 45 is designed so that, upon release of the latch arm, the cam follower arm 41 and pawl 40, during rotation of the cam, are partially rotated in a clockwise direction, by means of spring 46, thereby causing the pawl to ride over a tooth of the ratchet wheel and be in a position for advancing the ratchet wheel, one step, when the high point of the cam urges the cam follower arm and pawl in a counterclockwise direction. A fixed plate 47 secured to side plate 39a is provided with a camming surface which is engaged by the free end of pawl 40, as the latter is urged in a counterclockwise direction, thus, insuring a positive driving connection between the pawl and ratchet wheel, and, also preventing an overdrive of the ratchet wheel. The usual spring urged detent arm 48 is provided, and cooperates with a detent wheel 49 fixed to shaft 37 for maintaining the said shaft 37, ratchet wheel 38, and sprocket wheel 33 in the advanced position.

By this described mechanism, the tape 25 is advanced one step, for each cycle of operation of the machine for presenting the next transverse row of code perforations to the sensing elements. A single sensing element, such as sensing pin 50 (Fig. 3), having a shouldered recess 51, is provided for each unit of the code. The individual sensing pins are suitably disposed in individual openings formed in a U-shaped guide block 32, and are arranged to cooperate with individual sets of suitably disposed contact means 52. In the instant disclosure, five sets of contacts are provided, each set having an elongated spring blade which is engaged by an insulated end of the related sensing pin. With the sensing pins in retracted positions, as shown in Fig. 3, the said spring blades are urged sufficiently, to the left, to open the contacts 52.

Figure 4:
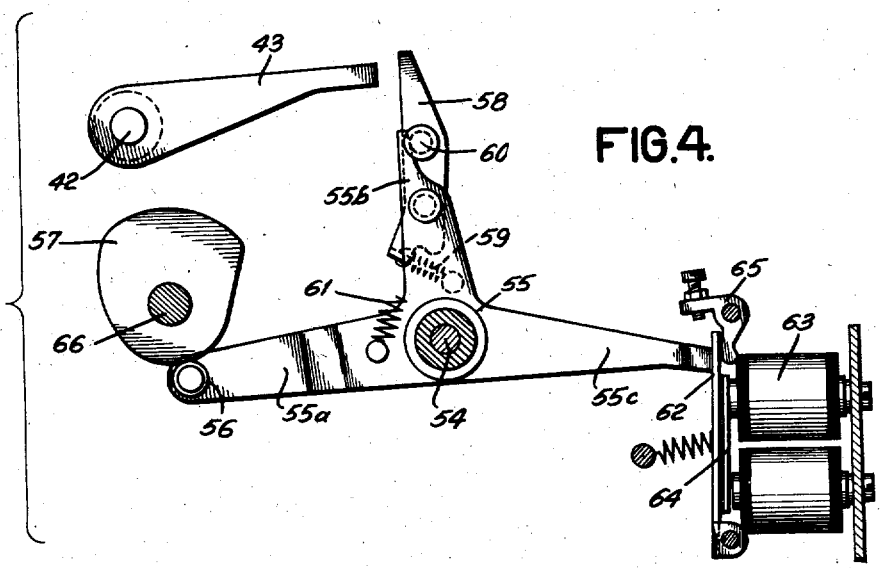
Figs. 4 and 5 are detail views showing different stages of operations of certain elements of the tape sensing unit.

Common to the said recesses of the sensing pin is a positionable vane or bail 53 secured to shaft 54. Shaft 54 is suitably journaled in side plate 39a and has secured thereto an inverted T or three armed lever 55, the left arm 55a of which, as viewed in Fig. 2, is provided with a cam roller 56 adapted to cooperate with a constantly rotated cam 57. The upright arm 55b of the said inverted T lever, carries a pivoted latch lever 58 which is urged, in a counterclockwise direction, by spring 59 so that the stop 60, fixed to the said latch lever, normally engages the upper extremity of the said upright arm of lever 55 (also see Figs. 4 and 5). The extremity of the right arm 55c of lever 55, as viewed in Fig. 2, normally is urged, by spring 61, against the top edge of latch plate 62 secured to the released armature 64 of latch magnet 63, thus latching the said inverted T lever in the normal position shown in Fig. 2. Normally, the latch arm 43 is held in a raised or latched position as shown, by means of the pivoted latch lever 58, thereby maintaining the tape feed pawl 40 in its uppermost or end-of-the-stroke position, as indicated in Fig. 2. With the inverted T lever in the described normal position, the constantly cyclic operations of cams 45 and 57 exercise no controlling effects on the related cam follower arms 41 and 55a, respectively. Also, in the said normal position of the inverted T lever, the bail 53 is moved to its extreme position to the left, as viewed in Fig. 3, against the lower shoulders or recesses 51 of the sensing pins 50, thus, holding the latter in their retracted positions, and maintaining the associated contacts 52 in normally open positions.

Upon momentary energization of latch magnet 63, its armature is attracted and the latch plate 62 is withdrawn from the arm 55c, so that the said lever 55 is unlatched or released, and, under the influence of spring 61, the latter is urged in a clockwise direction, (see Fig. 4) causing (1) release of latch arm 43, due to withdrawal of latch lever 58 on arm 55b, (2) release of arm 55a and thereby permitting full or effective cooperation between cam 57 and cam roller 56, and (3) release of the sensing pins 50, due to the partial clockwise rotation of bail 53.

Upon release of latch arm 43, cam follower arm 41, during a cyclic operation of cam 45, is partially rotated, first, in a clockwise direction, and then, in a counterclockwise direction to advance the ratchet wheel 38, shaft 37, and sprocket wheel 33, by means of pawl 40, thereby advancing the tape, one step, and presenting the next transverse row of code perforations to the sensing pins.

Upon release of the sensing pins 50, the code perforations are detected or sensed, by the spring urged pins permitted to pass through the perforations and extend into suitable slots or openings formed in the block 31. The travel of the code groups of pins sensing the perforations is sufficient to permit the related contacts 52 to be closed. In this manner, code groups of impulses can be initiated in the individual signaling or control circuits connected to the said sets of contacts 52 for suitable controlling purposes.

Figure 5:
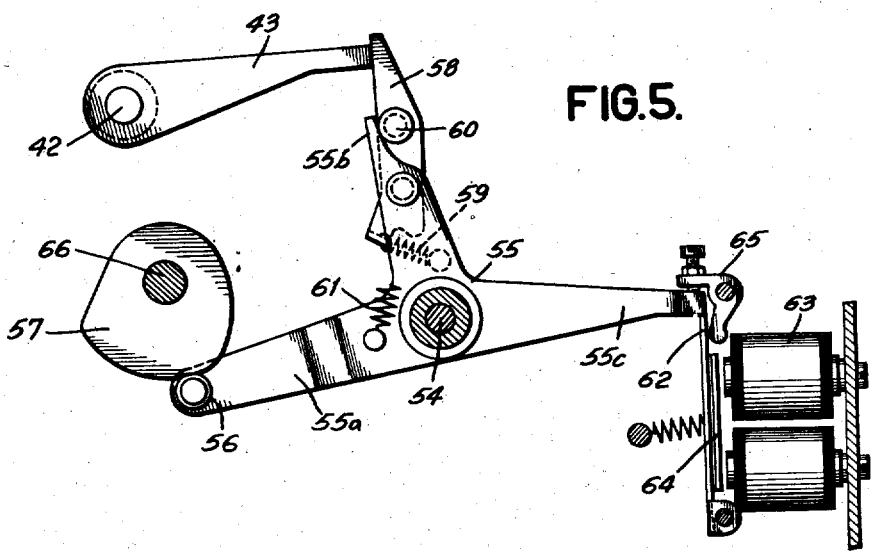

During a cyclic operation of cam 57, the lever 55 is first partially rotated in a clockwise direction, and then in a counterclockwise direction. When the highest portion of cam 57 is effective, the lever 55 is urged in a counterclockwise direction sufficiently to raise the arm 55c above the released latch plate 62 as shown in Fig. 5, thereby latching the lever 55 in the normal position. Also, during the cyclic operation of cam 57, and upon the partial counterclockwise rotation of lever 55 and shaft 54, the bail 53 is restored to its normal position, during which restoring operation, the shouldered recesses of the displaced sensing pins 50 are engaged and withdrawn from the perforations in the tape to restore the said pins and associated contacts to their normal positions. The said sensing pins and contacts are locked in this normal position so long as lever 55 is maintained in the described latched position.

Obviously, the described tape feeding operation must be suppressed until the actual sensing of the code perforations and withdrawal of the sensing pins from the tape are completed. In the instant case, it is preferred to prevent tape feeding until the sensing pins are latched in their normal positions. Accordingly, the cams 45 and 57 are arranged so that the high point of the latter is effective to latch the lever 55, before the high point of the former is effective to cause actuation of the tape feeding pawl 40 (see timing chart Fig. 6). For this reason, the latch lever 58 is arranged to be pivotally disposed on arm 55b. After the lever 55 is restored to normal, as shown in Fig. 5, and before the high point of cam 45 is effective to raise the latch arm 43 to its latched position, the pivoted latch lever 58 abuts the end of latch arm 43, and is only restored into latching position by spring 59, when the latch arm 43 is raised over the said lever 58. In this manner, tape feed operations are effected after the sensing pins are retracted from the tape, and latched in the said retracted positions. It should also be mentioned that a suitably pivoted restoring lever 65 is provided for positively moving the latch plate 62 to its normal position, when the arm 55c is raised.

Now, with reference to Figs. 1 and 2, it is seen, that cams 45 and 57 are secured to and driven by shaft 66 to which worm gear 67 is affixed, said gear being in mesh with a worm 68 constantly rotated by motor 69. Thus, the cams are operated continuously for controlling the sensing and tape feed operations, at such times when the control magnet 63 is energized. Also, if desired for various circuit controlling purposes, cams 70 and 71 are shown secured to shaft 66 for controlling the operations of the suitably disposed and related contacts C1, and C2, C3 respectively. In addition thereto, a suitable frictional drive may be provided for the take-up reel 35, by providing a driving pulley 72 on shaft 66, which pulley is connected by a spring belt 73 to intermediate pulley 74, the latter being secured to stud shaft 75 carrying pulley 76, which in turn is connected to pulley 77 mounted on the take-up reel shaft 78 by spring belt 79.

Referring to Fig. 3, additional circuit controlling means can be provided in the form of contacts 80, which are arranged to be opened, upon exhaustion of the tape supply to the sensing pins 50. The tape guide arm is secured to shaft 81 journaled in the side plate 39a, which shaft also carries bell crank lever 82. By means of spring 83, the said bell crank and tape guide arm are normally urged in a clockwise direction so that an insulating pin 84, secured to lever 82, opens contacts 80. This motion, however, is prevented when the supply of tape from roll 28 is not exhausted, due to the tape riding over the guide arm 30 and causing the said guide arm and pin 84 to be held in the positions shown in Fig. 3. An arcuately shaped and slotted tape guide member 85 is also provided to press the tape against the sprocket wheel 33, which member is secured to stud shaft 86 journaled in side plate 39a. Also secured to stud shaft 86 is a depending arm 87 arranged to engage the suitably disposed toggle spring 88. The said arm 87 is capable of engaging a pin 89 (secured to lever 82), whenever the guide member 85 is raised manually (for example, during insertion of a new tape), to rotate the bell crank lever 82 and tape guide arm 30 in a counterclockwise direction, thus facilitating tape removal or insertion operations.

In order to insure proper synchronous operations of the described elements, it is preferred to include the cam controlled contacts C1 in the circuit connected to the control magnet 63. In this manner, irrespective of the times the control impulses are impressed upon the circuit including magnet 63, the latter is not energized to release the said lever 55 until a predetermined time during each cyclic rotation of cams 45 and 57, as indicated in the timing chart in Fig. 6. Thus, it is seen, by this provision, that the operated elements are influenced and actuated in the described sequences.

4. Record card

Figure 8:
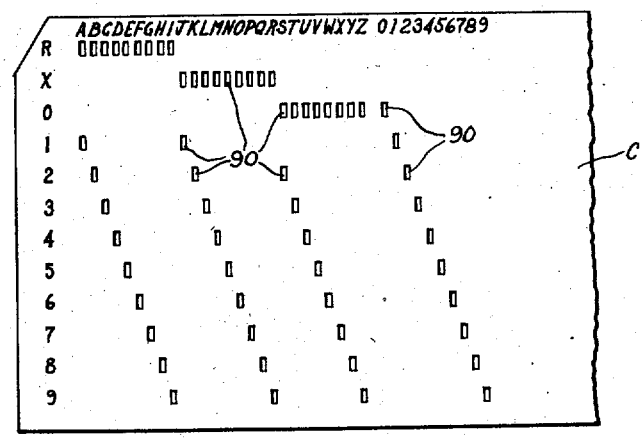
Fig. 8 shows a portion of a statistical record card having coded data designating perforations formed therein according to one statistical code.

With reference now to Figs. 7B, 7C and 8, the sheet to be perforated in either the A or B punch unit is shown to comprise a well known tabulating machine record card, generally designated C, of the type quite commonly used in the Hollerith electric tabulating systems. Differentially positioned control representations, such as perforations 90, are used to represent the various data and character designations. The perforations are differentially positioned in various columnar areas or fields of the record card, and by the differential positioning thereof different data values are imparted thereto. It is seen, that the letters of the alphabet are designated by pairs of control representations or perforations, each perforation of a pair being located in one of the twelve index point positions of a columnar area. Commonly, the index point positions indicated as "R" and "X" are referred to, in the tabulating systems, as the "twelve" and "eleven" index point positions, respectively.

The Hollerith character code shown in Fig. 8 is quite an arbitrary one and different well known codes which have been used in statistical systems may be employed in the present recording system. It will be noted, by reference to the said code in Fig. 8, that the alphabet is divided into three groups. The letters of the first group A to I are designated by different combinations of a perforation in the "R" index point position with perforations in the one to nine index point positions. The letters of the second group J to R are designated by perforations in the "X" position and combination of perforations in the one to nine positions, while the letters of the third group S to Z are identified by combinations of a "0" perforation with perforations in the two to nine index point positions. The individual numerical characters are represented by a single perforation in the corresponding zero to nine index point positions. The record cards may have as many columnar areas for the reception of the data designating perforations as may be desired. The description to be set forth hereinbelow related to mechanism commonly used in tabulating systems employing the standard eighty column record card.

5. Record perforating unit

Referring now to Figs. 9-13, only one of the selectively controlled card punch units will now be described, since they are duplicates. As mentioned hereinabove, the tape sensing unit is electrically and selectively connected with the plurality of punch units to effect punching of record cards, in predetermined columns, in accordance with the data sensed on the telegraphic tape and start and stop signals therein. The punch unit A or B is well known in the art, and is usually referred to as "The International duplicating punch." The following brief and general description of one unit is believed sufficient in order to fully comprehend its use in the present invention; however, if a more detailed and complete description of the punch unit per se is desired, reference should be made to U. S. Patent No. 1,976,618, and to the punch at the top of Fig. 1 of U..S. Patent No. 2,016,686.

During the operation of either punch unit A or B, a blank statistical card C is fed from the bottom of the hopper 111 by the usual picker knife 112, and is advanced to the left, as viewed in Fig. 9, to a position where the said card is received by the positionable card carriage 113. The card is then punched, column by column, as desired, and the card carriage moves, step by step, to the left. When the punching of the card is completed, and the card carriage has reached the end of its movement, the punched card is automatically removed, and the operation just set forth can be repeated.

The said punch unit can be controlled manually, by depression of the data keys 114, or automatically, under control of the magnets 115, which herein are punch selector magnets. The individual armatures 116 (Fig. 10) of the magnets 115 are connected to the related keys 114 by individual pivoted links 117, so that, upon energization of the said magnets, the corresponding data keys 114 are caused to be depressed. Depression of a key 114 actuates an associated bell crank 118 which, in turn, effects positioning of a related interposer 119 to the left, as viewed in Fig. 10. Whenever an interposer 119 is thus positioned, it can be acted upon by a depending member 120 of a depressor plate 121. Upon positioning an interposer 119, to the left, a common bail 122 is rocked, raising an arm 123, thereby causing contacts PC to be closed.

Closure of the said PC contacts causes energization of the punch magnet 124, whereupon, the armature 125 (Fig. 11) is swung about its pivot, rocking bell crank 126, through the link 127, and drawing downwardly the link 128, thereby causing the depressor plate 121 to be rocked. Upon rocking of the said depressor plate, the positioned interposer 119 is depressed, consequently, causing the corresponding punch 130 to be depressed to perforate the card in a corresponding index point position. As the punch passes through the card, and the link 127 moves to the right, the lug 131 pushes the arm 123 to the right (as viewed in Fig. 11) to release and open the said contacts PC, thereby causing the said punch magnet 124 to be deenergized, and permitting the punch and its actuating mechanism to return to the shown normal position.

Figure 12:
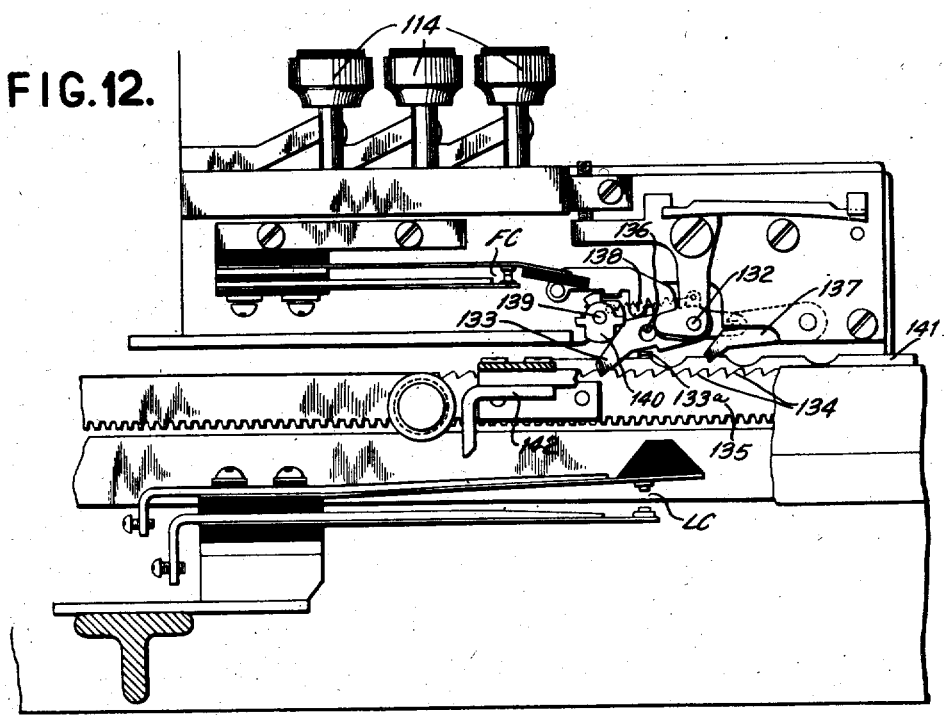
Fig. 12 is an enlarged view illustrating the details of the carriage escapement mechanism of the perforating unit.
Figure 13:
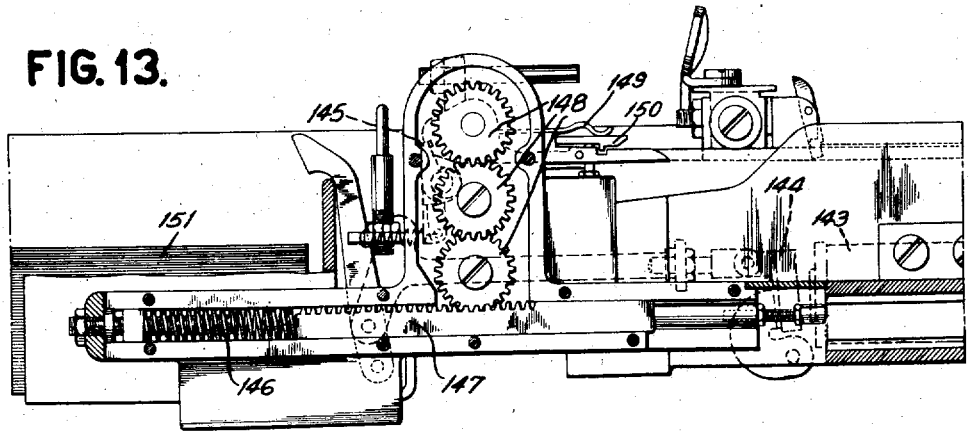
Fig. 13 is a view, in side elevation, of the ejecting mechanism of the perforating unit.

With each punching operation, the well known escapement mechanism, shown in Fig. 12, is operated to permit the card carriage 113 to be released one step, in order to present the next adjacent column of the card to the punches. Thus, for each punching operation, shaft 132 is rocked in a clockwise direction and then a counterclockwise direction, to first effect disengagement of pawl 133 from teeth 134, formed on the top side of the card carriage rack 135, by a shaft actuated pin 136, and the engagement of latch pawl 137 with teeth 134. Spring 138 will then pull pawl 133, to the left, on its loose pivot, to rest on top of a tooth, so that, when the counterclockwise movement of the shaft 132 raises pawl 137, the advance of the rack 135 and card carriage 113 will be halted, by pawl 133 engaging the next tooth.

The rocking of the common bail 122 also causes the shaft 139, affixed thereto, to be rocked, as well as the T-shaped element 140, consequently, opening the well known floating cam contacts FC, each time the card carriage is advanced. The usual skip bar 141 can be provided, for cooperation with the pawl 133 through the agency of the usual skip lifter arm 133a to permit an extended movement of the card carriage, until the next low spot in the skip bar allows the said pawl to be lowered.

Thus, it is seen, that the punches 130 can be operated selectively, under control of the punch selector magnets 115, to effect punching of the desired data in the card 110, in adjacent columns, step by step, or, to automatically skip predetermined columns of the card, under control of the skip bar 141, and effect punching only in certain predetermined columns. The usual skip magnet 171 and release magnet 172 (Fig. 14A or Fig. 14G) are provided for controlling in the related punch the action of the said lifter arm 133a so that multiple column advancement of the card, and complete release of the card from any position to the last column position, respectively, can be effected in either punch upon energization of the related ones of said magnets.

The said card carriage 113 is provided with extensions 173 and 174 (Fig. 9) between which a pattern or master card M can be positioned and moved back and forth with the card carriage. Positioned above the pattern card is a contact roller 175 (see Fig. 14A or Fig. 14G) which is insulated from the frame of the machine. Directly below the roller is a row of positionable sensing brushes 176. The usual brush magnet 170 is provided, which upon energization causes an upward movement of brushes 176 into engagement with the pattern card.

Upon extension 174 for each punch is mounted a brush carrier, of a punch readout device 165, provided with electrically connected brushes 168 (see Figs. 9 and 14F or 14L), one of the said brushes cooperating with a common conducting strip 166, and the other of said brushes cooperating with the equally spaced conducting segments 167. As is well known, the brushes 168 connect successively the conducting segments 167 to the common conducting strip 165, as the card carriage of each punch moves along step by step.

As mentioned before, provision is also made in each punch, for automatically ejecting the punched card, after the card is positioned to the last column position, and returning the card carriage to pick up another card, from the picker, for subsequent punching operations. After the positioning of the last column of the card to the punching position, the last column contacts LC are closed, by means of bracket 142 secured to rack 135. It will be explained later, how the closure of contacts LC effects energization of the ejector magnet 143 of the releated punch. Upon energization of magnet 143, the associated armature 144 is partially rotated, in a clockwise direction, to actuate the associated mechanism to release latch 145. This permits spring 146 to move rack 147 to the right, as viewed in Fig. 13, and gears 148 to actuate the gripper jaws 149 and 150, thereby raising the card just punched, and depositing it upon the stack 151. Return of the said jaws is accomplished, by movement of the rack 147, to the left, by the end of rack 152 (Fig. 11), during the return of the card carriage, which will be described presently. It should be mentioned, at this time, that suitably disposed auto-start control contacts AC (see Fig. 14A or Fig. 14G) are provided, so that these contacts are closed by the rack 147, when the latter is positioned to the right, as viewed in Fig. 13 (these contacts are designated 201 in the said Patent No. 1,976,618).

It will be shown later, that closure of contacts AC causes the clutch trip magnet 153 (Fig. 10, Fig. 14A or 14G) to be energized. Referring now to Figs. 10 and 11, upon energization of the said magnet 153, armature 154 is partially rotated, in a clockwise direction, to cause the attached arm 155 to depress block 156 under the shoulder of latch 157, thereby causing the latch contacts CT1 to be held open, and contacts CT2 closed. It will be shown, that closure of contacts CT2, causes the carriage return motor M to be energized, the latter, in turn, causing the shaft 158 to be rotated.

Another arm 159, attached to said armature 154, is depressed to cause the pawl 160 to engage one of the teeth of ratchet 161, the latter being secured to shaft 158. The pawl 160 is pivotally carried by disk 162, which disk, in turn, is secured to gear 163, so that gear 163 is set into rotation, whenever the clutch mechanism is tripped, as described. Since gear 163 is in engagement with the lower set of teeth of rack 152, the said rack 152 and card carriage 113 are returned to the right, as viewed in Fig. 1, upon rotation of gear 163, to receive another card from the said picker 112.

A fixed camming bracket 164 is provided to engage the free end of pawl 160, during its rotation, thereby disengaging the said pawl and ratchet, upon one revolution of shaft 158. Provision is also made to release the latch 157, at this time, to restore the said contacts CT1 and CT2 to the normal positions shown in Figs. 10 and 14A and 14G.

6. Operation

Referring now to Figs. 14A to 14L, arranged as indicated in Fig. 15, the operation of the described units will be explained in connection with the circuit diagram and the exemplary message of Fig. 7A.

Figure 14A:
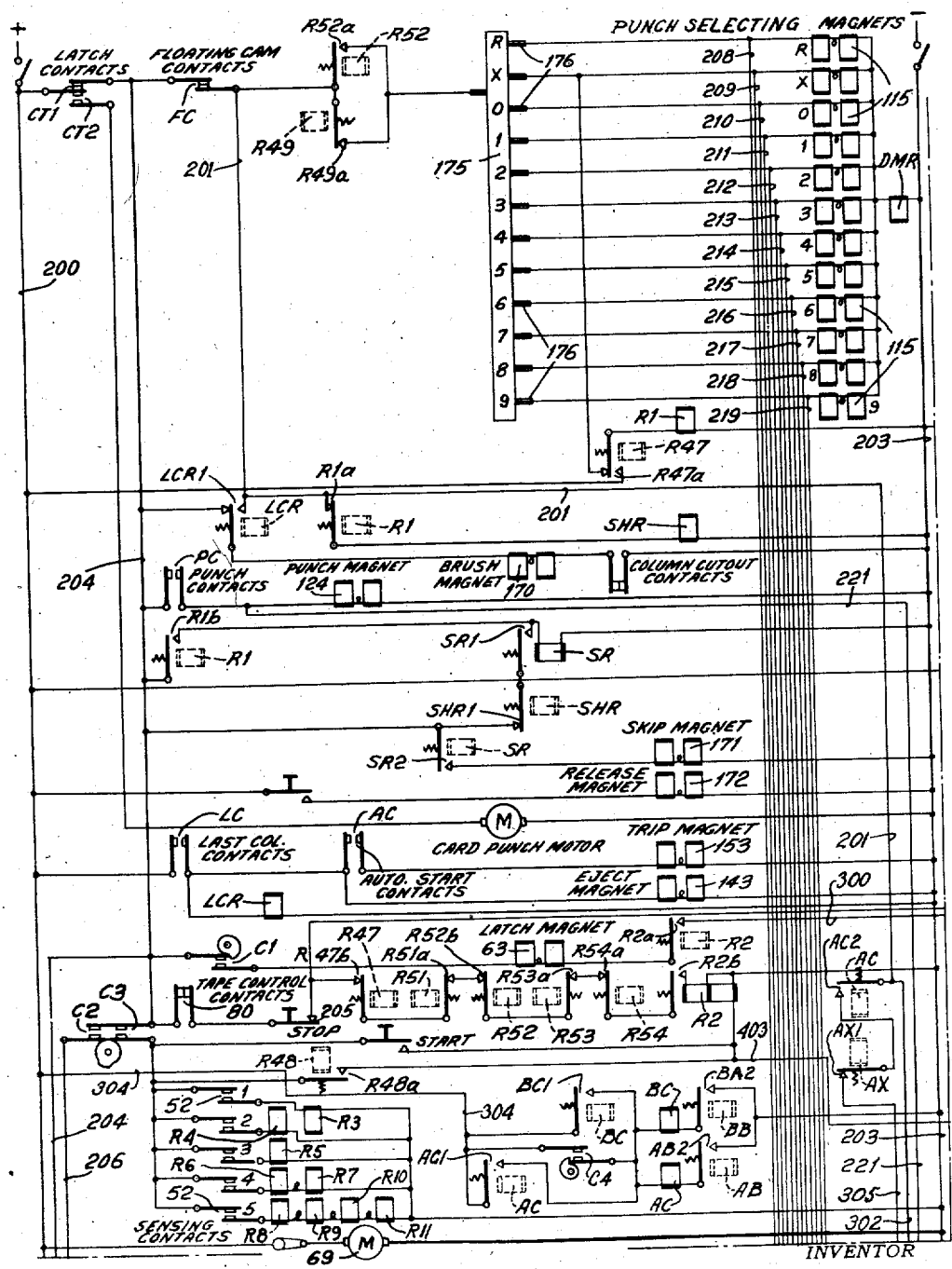
Figure 14B:
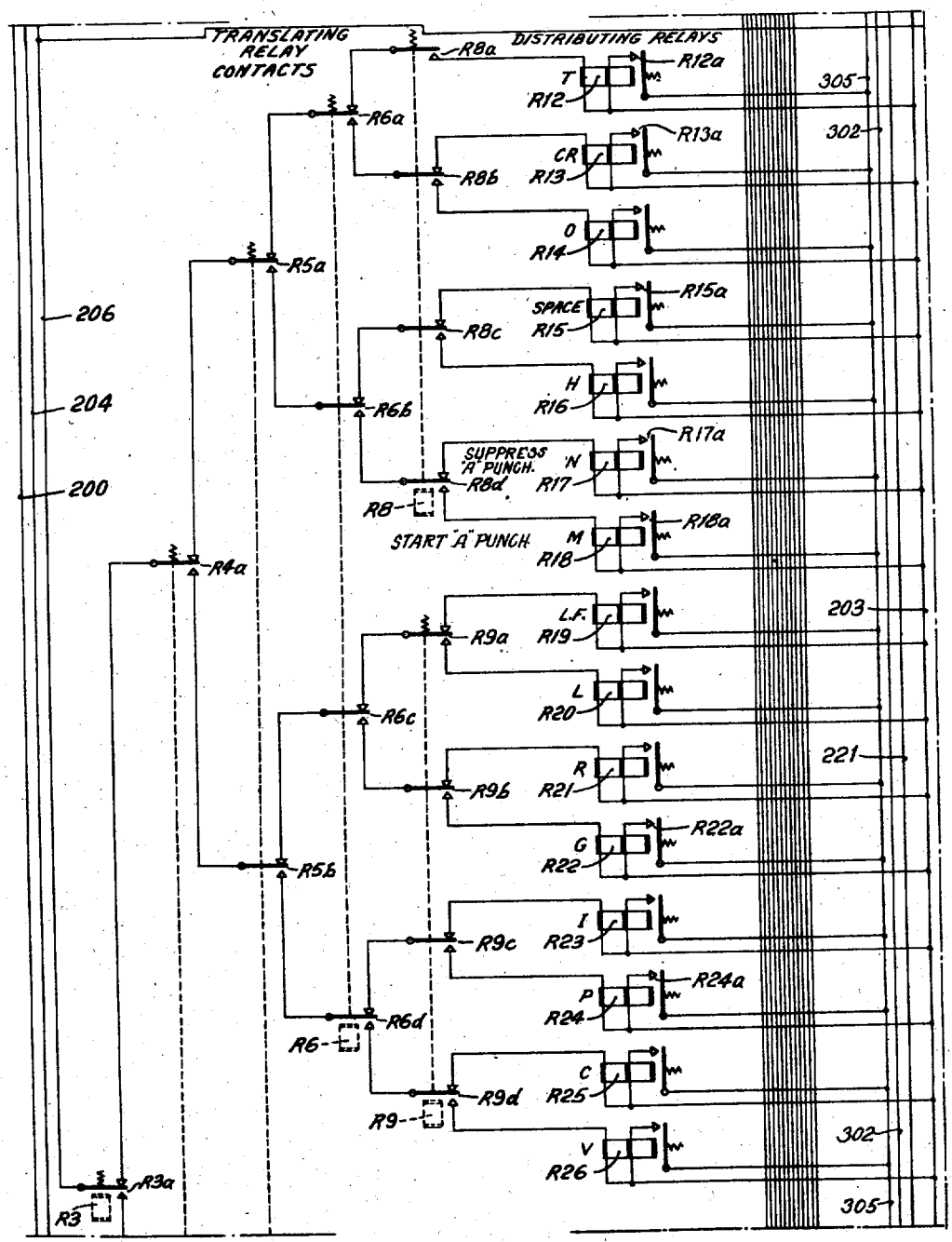
Figure 14C:
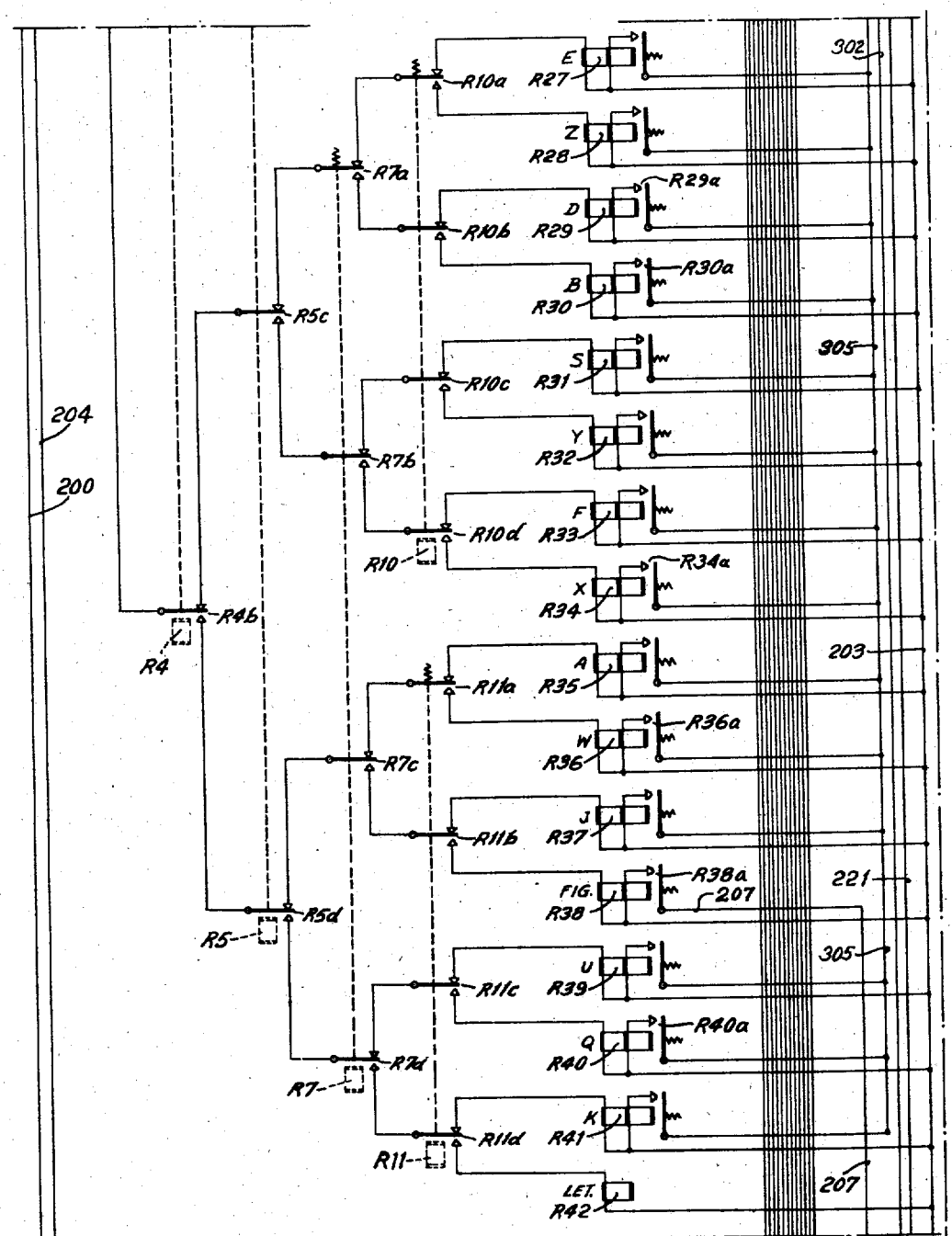
Figure 14D:
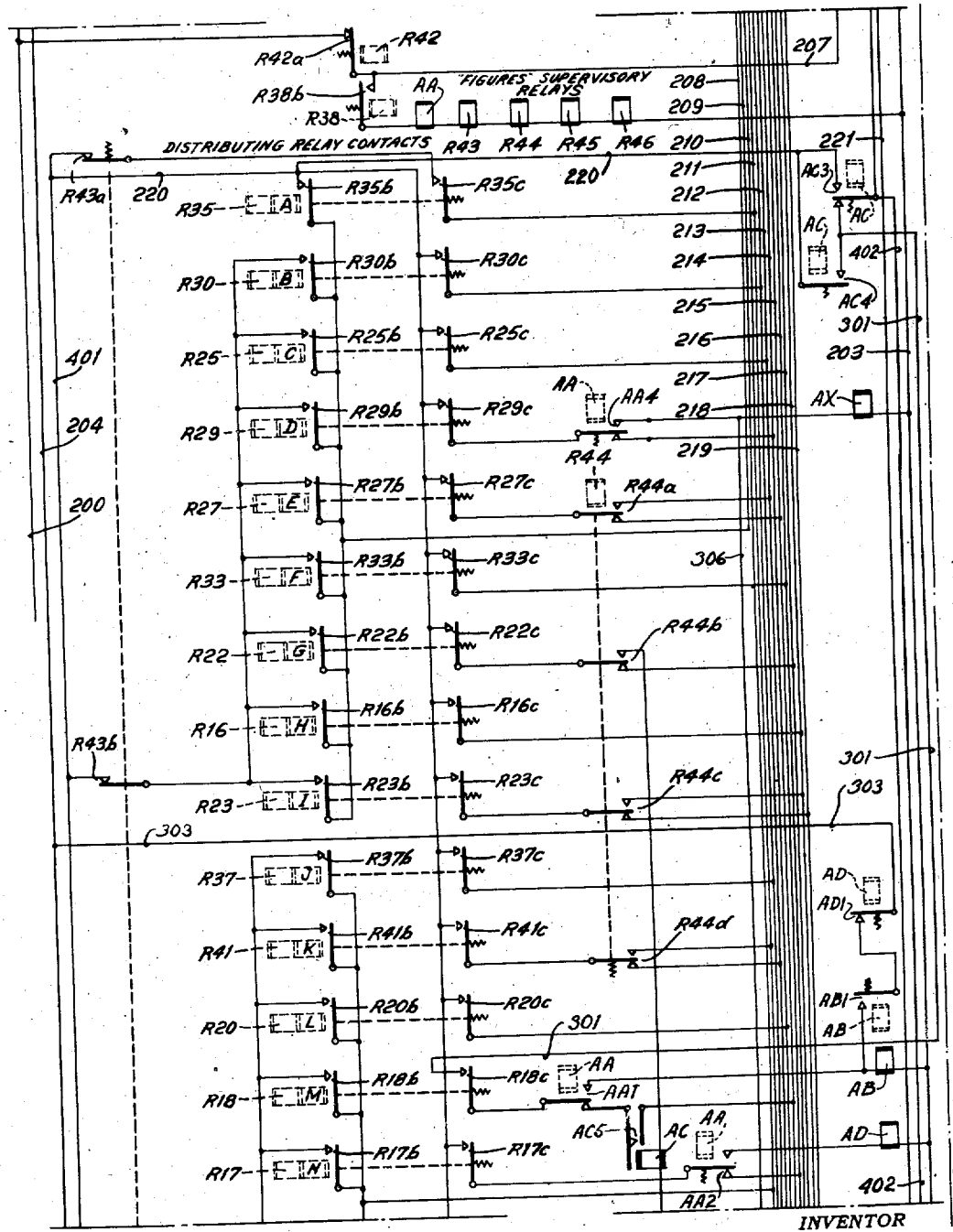
Figure 14E:
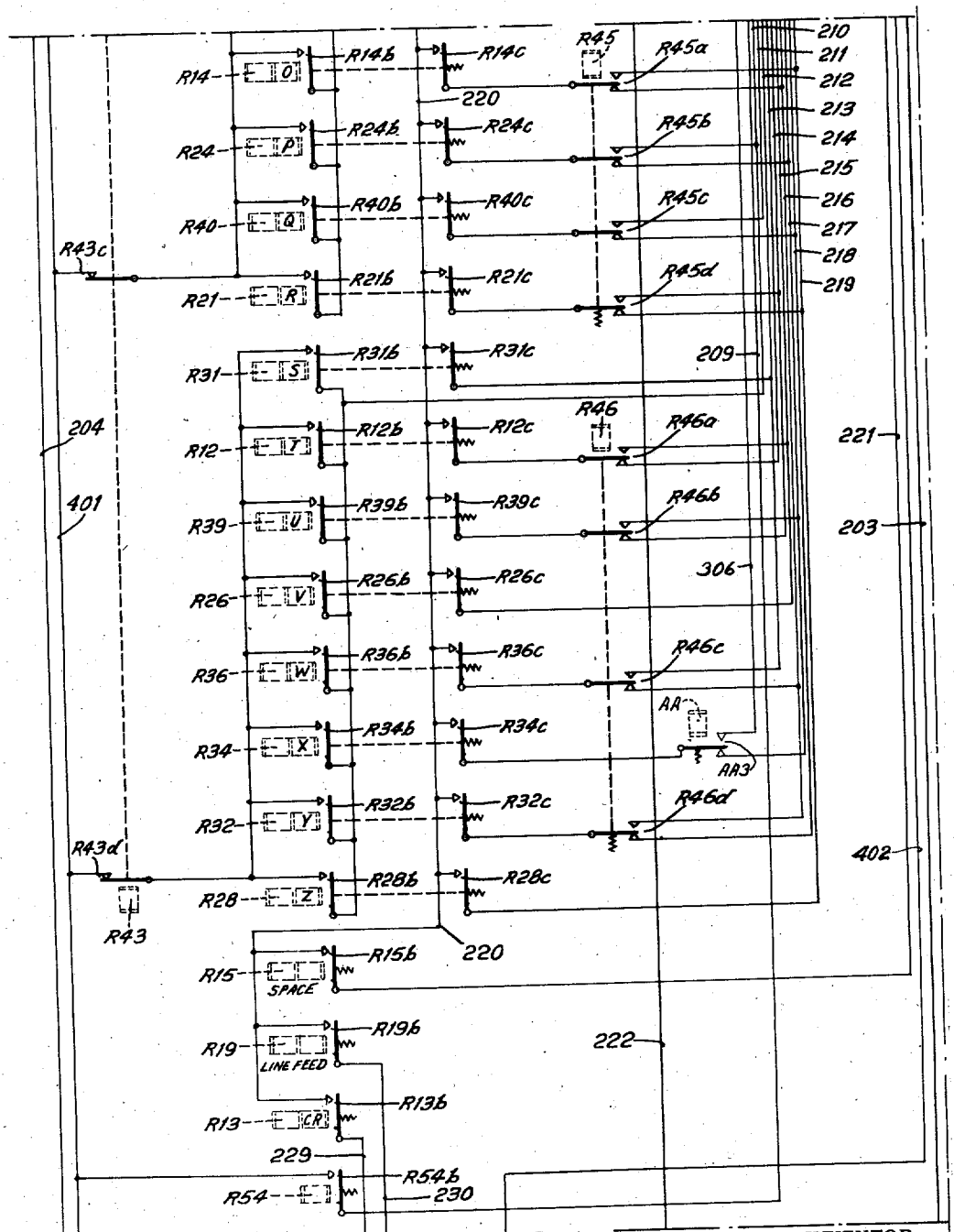
Figure 14F:
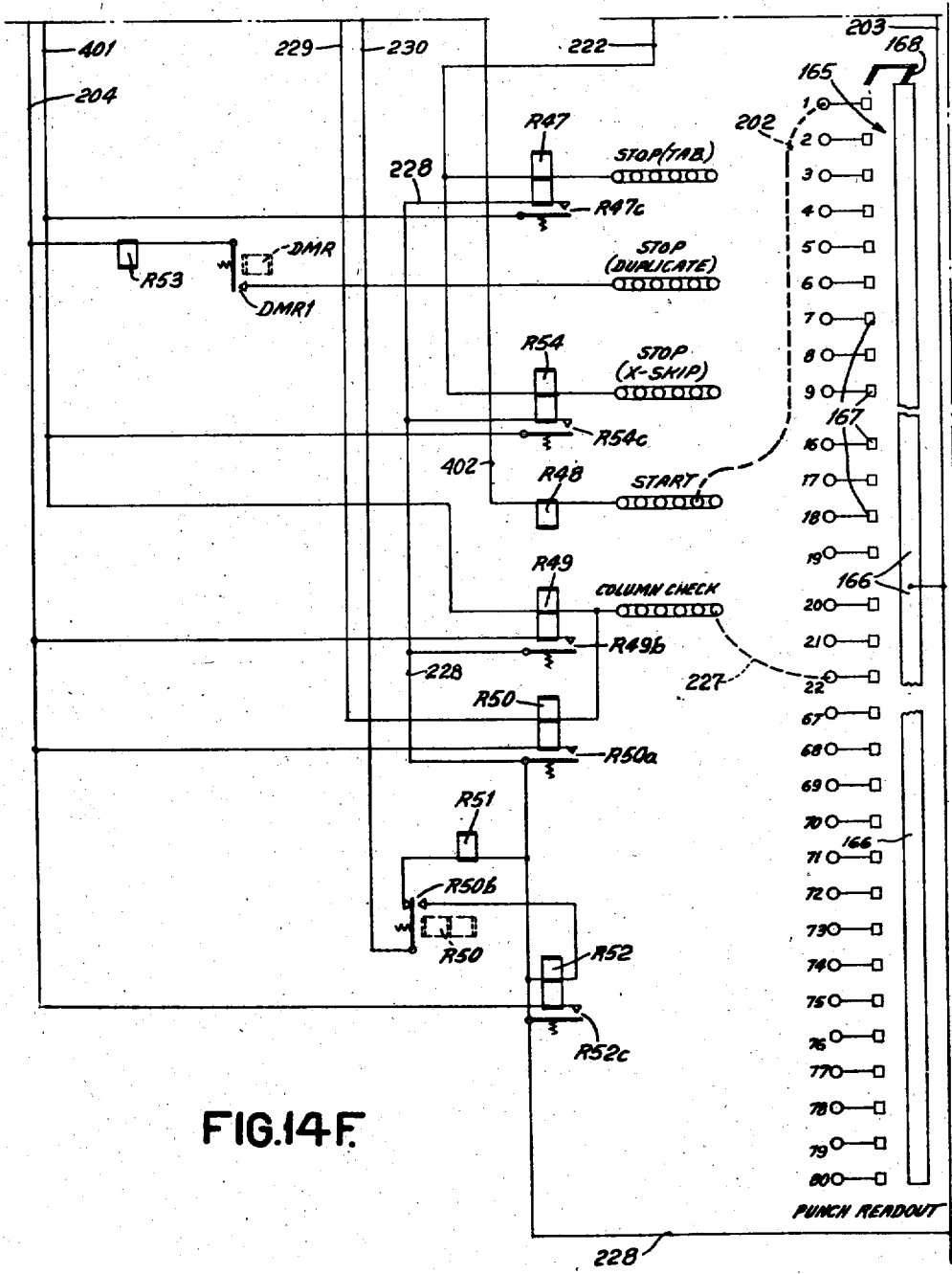
Figure 14G:
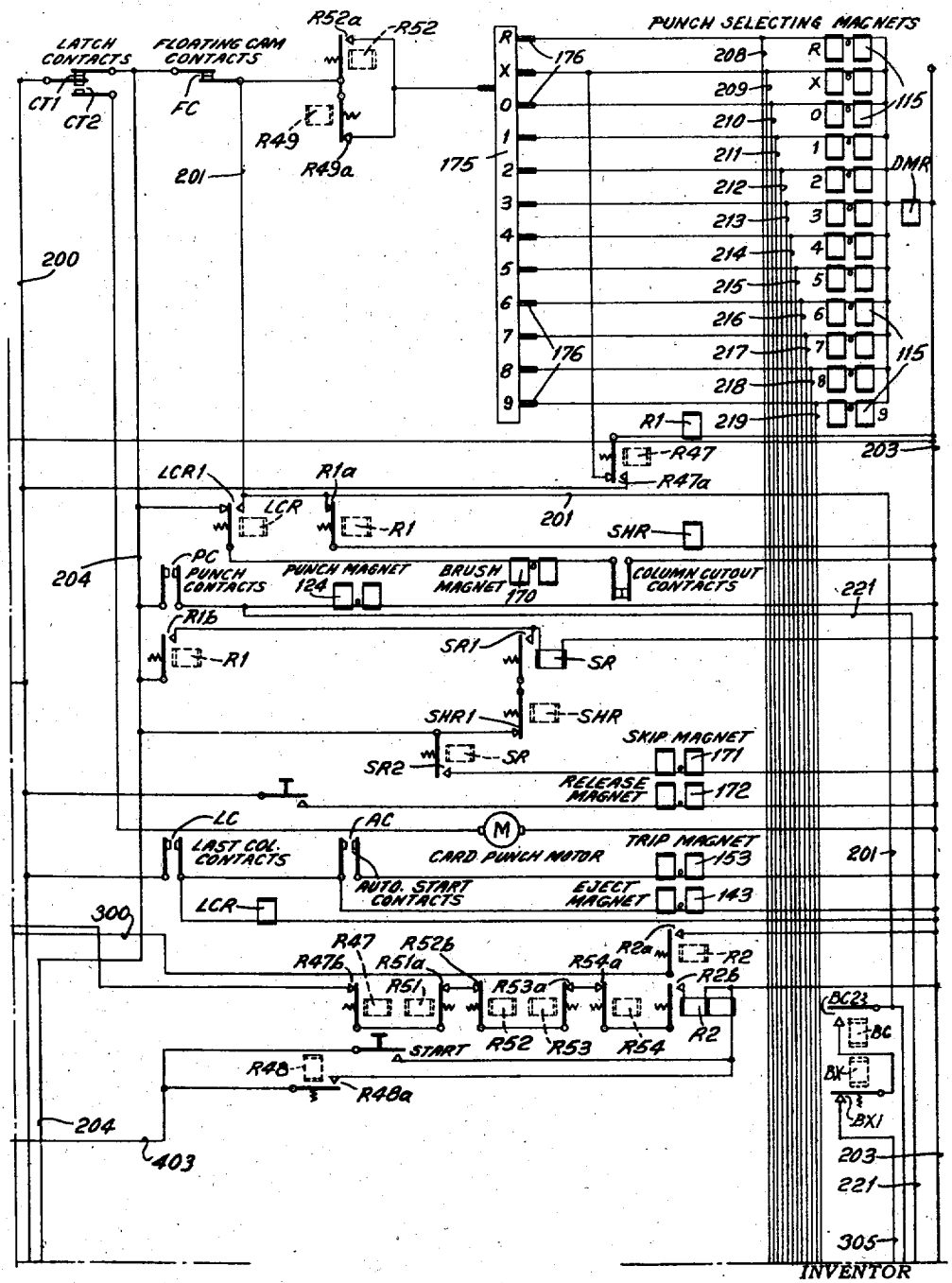
Figure 14H:
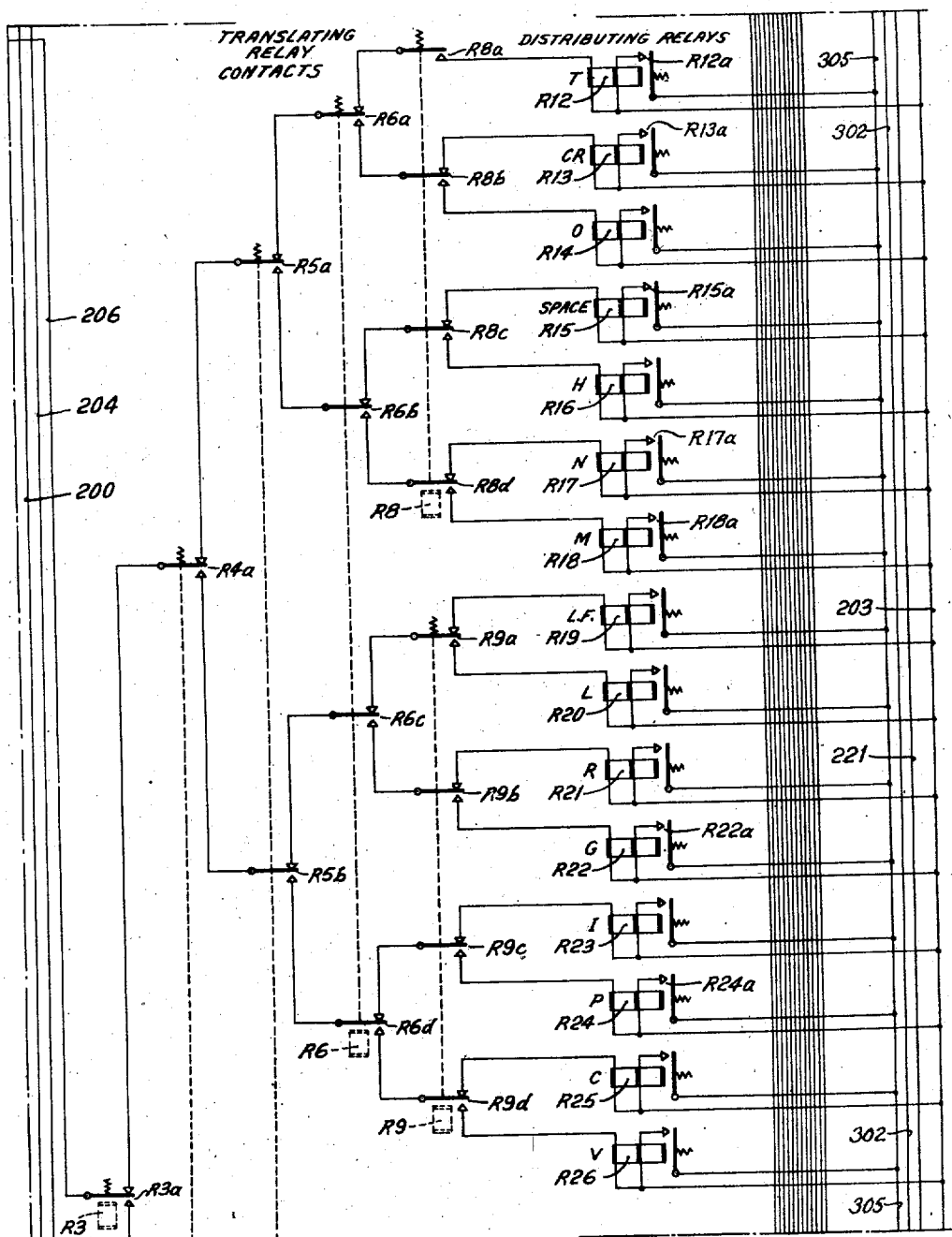

Assume that the telegraphic tape 25 of Fig. 7A is properly inserted in the common controlling sensing unit, and that a statistical card C is positioned in the first column position of each of the card punch units A and B; also, assume that the first part of the message perforated in the tape is —123JOHN JONES— which is to be punched on the card in both punch units and that the punch readout device of each punch is suitably plugged by connector 202 from the "1" column position of the punch readout device 165 to the "start" plug socket (see Figs. 14F and 14L). With the card carriages of both punch units at the first column position of the card the machines are automatically started in operation by the concurrent energization of relays R48 of both punch units, each of which closes its respective contacts R48a (Fig. 14A and Fig. 14G). By an obvious circuit the P2 relays of both punch units are energized.

A holding circuit for each R2 relay is provided by the circuit from line 200, contacts CT1, conductor 204, normally closed contacts 80, contacts 205 of the stop key, normally closed contacts R47b, R51a, R52b, R53a and R48a, contacts R2b now closed, to the holding coil of each relay R2 to line 203. The holding circuit for each relay is maintained continuously until one of the mentioned normally closed contacts included therein is open. At the end of the cycle of operation of the sensing unit, cam contacts C1 are closed and with contacts R2a of the A punch and B punch closed, a circuit is completed to the latch magnet 63 from line 200, CT1 contacts, wire 204, cam contacts C1, latch magnet 63, contacts R2a of the A punch, wire 300, contacts R2a of the B punch (Fig. 14G) to line 203, thus energizing said magnet and causing a cyclic operation of the tape sensing unit. It is to be noted that said contacts C1 are opened and closed during each cycle to effect a momentary energization of the latch magnet 63. The timing of the sensing unit is arranged in the instant case so that a cycle of operation thereof is not completed before the card punch operations for each column are completed.

Thus, under the above mentioned conditions, successive idle tape sensing operations ensue until the "figures" code designation is sensed by the sensing elements 50, conditioning the translating mechanism so as to cause numerical data to be perforated on the statistical card.

Thereafter, punch selecting signals, figures case M and figures case D are analyzed on the tape to successively select the A punch and the B punch for operation in a manner to be subsequently explained in detail.

As will be subsequently described in detail, upon the completion of punching of statistical cards under control of the complete message in a section of the tape, both card carriages are automatically returned to the first column position of the card to the punching station. This will automatically continue the operation of the tape sensing unit by the following circuit. Upon closure of floating cam contacts FC of each punching machine, a circuit is established from line 200, through the normally closed latch contacts CT1, said floating cam contacts FC, wire 201, conductor 202 (Figs. 14A, 14B, 14C and 14D), wire 402 (Figs. 14D, 14E and 14F), coil of relay R48, plug connector 202, the column "1" conducting segment 167, brushes 168 and common conducting strip 166 to line 203. In a similar circuit, referring to Fig. 14K, the R48 relay associated with the B punch is energized. Referring to Figs. 14A and 14G, it will be seen that the relay contacts R48a for punch A and punch B are shunted across the respective start key contacts, thereby completing circuits to the R2 relays for both punch A and punch B. Such relays, through the previously described circuit, will cause the energization of the latch magnet 63, initiating successive cyclic operations of the tape sensing unit until the first column of coded designations on the tape for the subsequent message is sensed.

Figure 6:
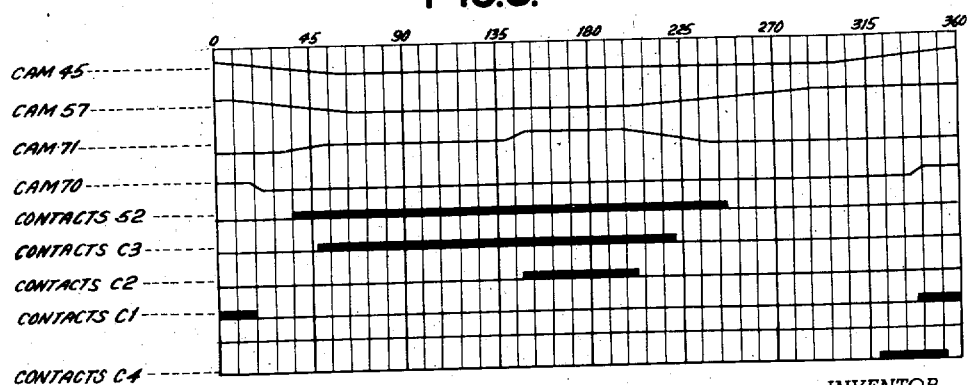
Fig. 6 is a timing chart of cyclically operable cam operated contacts of the sensing unit.
Figure 14I:
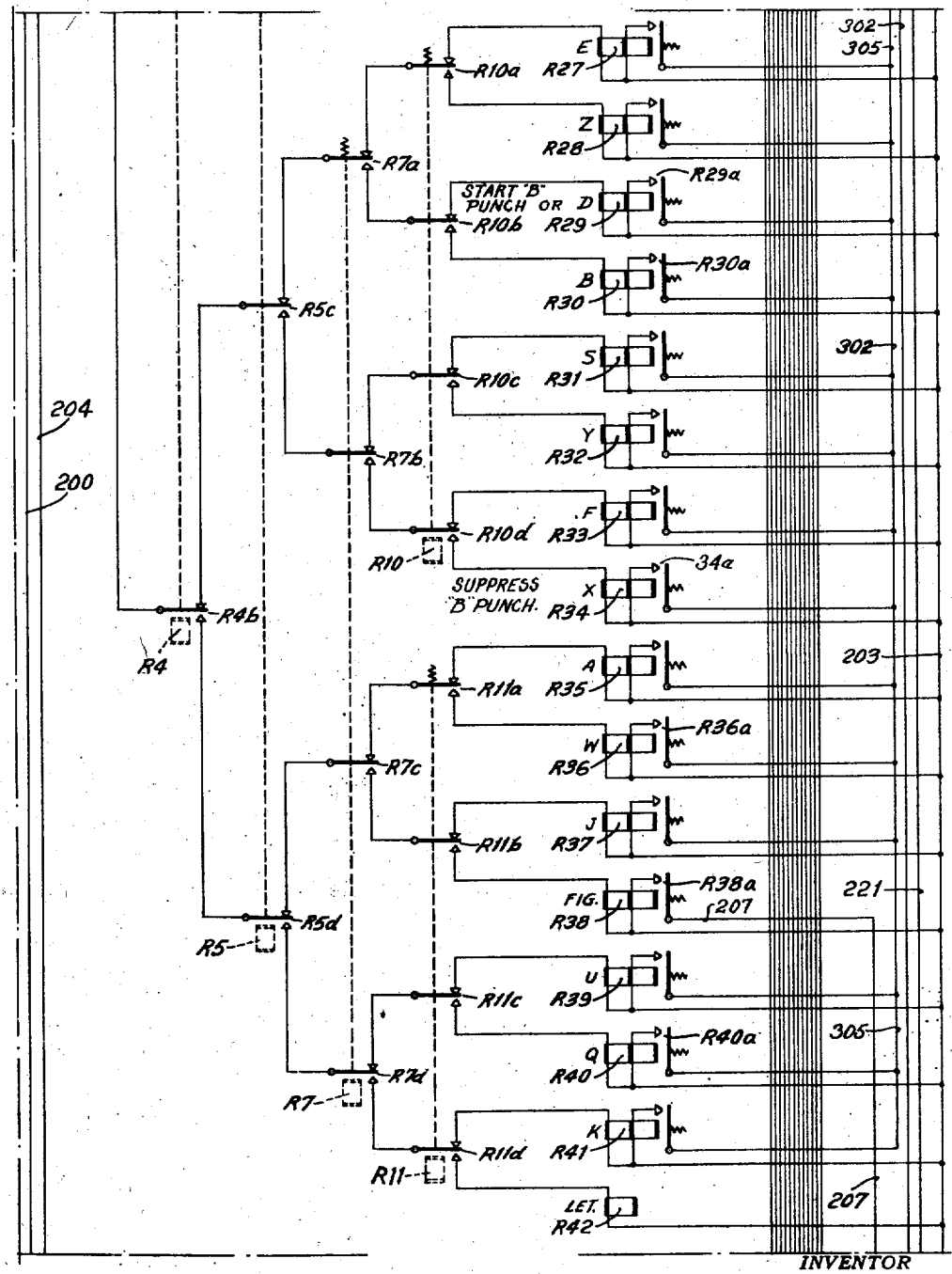

*Numerical data.*—It was assumed, that the first three characters of the data recorded on the tape belong to the numerical group, and accordingly, as shown in Fig. 7A, these data designations are preceded by a common key code "figures" designations and code designations to select punch A or punch B for operation. During the first operation of the sensing elements, and upon sensing the said "figures" code designations, the "1," "2," "4" and "5" contacts 52 are closed. Upon closure of cam contacts C3, circuits are completed through the said contacts 52, to energize the translating relays R3, R4, R6 and R7, R8, R9, R10 and R11, respectively, as follows: Conductor 200, latch contacts CT1, conductor 204, cam contacts C3, the said sensing contacts and translating relays to conductor 203, thus causing the said relays to be energized. Accordingly, the associated translating relay contacts for each punch—R3a, R4a—R4b, R6a—R6d, R7a—R7d, R8a—R8d, R9a—R9d, R10a—R10d, and R11a—R11d are shifted or transferred to permit the following circuit to be established, upon closure of cam contacts C2 (which cam contacts C2 are closed during the time cam contacts C3 are closed, as indicated in Fig. 6), conductor 200, latch contacts CT1, conductor 204, cam contacts C2 (Fig. 14A), conductor 206, transferred contacts R3a, R4b, normally closed contacts R6d, transferred contacts R7c and R11b to the pickup coil of the "figures" distributing relay R38 (Fig. 14C and Fig. 14I) to line 203, energizing relay R38 for both the A punch (Fig. 14C) and the B punch (Fig. 14I). A holding circuit is established for each relay R38 from line 200 to normally closed contacts R42a (Figs. 14D and 14J), conductor 207, contacts R38a to the holding coil of relay R38 and to line 203. This holding circuit for each relay is maintained until the normally closed contacts R42a of the "letters" relay R42 are opened. Closure of contacts R38b (Fig. 14D) closes a circuit from the line 200 through contacts R42a and R38b through relay coil AA, coils of the "figures" supervisory relays R43, R44, R45 and R46 to line 203, thus energizing such supervisory relays as well as the AA control relay. By a similar circuit, referring to Fig. 14J the "figures" supervisory relays for the B punch are energized as well as the BB control relay. Accordingly, contacts R43a—R43d are opened and contacts R44a—R44d, R45a—R45d and R46a—R46d are transferred. These mentioned contacts are maintained in the said operated positions until the said "letters" relay is energized. Thus, the group of circuits connected to the distributing relay contacts (see Figs. 14D and 14E) are conditioned under control of the described "figures" supervisory circuit. No circuits are completed through these conditioned circuits, to the group of circuits 208—219 and the connected duplicating magnets 115, at this time, for effecting energization of the said magnets.

The AA and the BB relay coils operate their respective contacts so that the machine may be conditioned to receive subsequent signals, whether such signals are for the purpose of individually selecting the punches A or B for operation or for suppressing the operation of either punch if it was previously in operation. In view of the fact that the signal after "figures" sent under control of the second column of tape perforations analyzed may be for the purpose of selecting either punch for operation, both the AA and the BB relay coils are energized. The particular contacts which are operated by the AA and BB relay coils and their function will be described later in the specification.

In order to understand at this point of the description the manner in which the punch selecting circuits are closed, these circuits will be outlined with the assumption that the tape has been stepped to such a column position that in the tape sensing operation for this column position the sensing pins will sense the numerical code designations for the numeral "1."

Upon sensing the numerical code designations for the numeral "1," the "1," "2," "3" and "5" sensing contacts 52 are closed to permit relays R3, R4, R5, and R8, R9, R10 and R11, repectively, to be energized, upon closure of the said cam contacts C3, through circuits traced in detail hereinabove. Upon closure of cam contacts C2, the following circuit is completed through the groups of translating relay contacts: conductor 200, latch contacts CT1, conductor 204, cam contacts C2, conductor 206, transferred contacts R3a, R4b, R5d, normally closed contacts R7d, and transferred contacts R11c to the pickup coil of distributing relay R40 and conductor 203, energizing said relay. A holding circuit is immediately established by this relay from conductor 200 through latch contacts CT1, floating cam contacts FC, conductor 201, relay contacts AC2 closed when the A punch is selected for operation, AX1 contacts, wire 305, contacts R40a (Fig. 14C) and the holding coil of relay R40 to conductor 203. This holding circuit is maintained until the said contacts FC are opened as an incident of each punching operation. The hold circuit for R40 relay for B punch is similar but is closed through the BC2 contacts closed when the B punch has been preselected for operation.

The "b" and "c" contacts of relay R40 (Figs. 14E and 14K) are normally effective to control the punch selecting magnets of the selected punch so as to punch the alphabetical character "Q" in statistical code in the card, however, due to the control exercised by the "figures" supervisory relays over the circuits connected to the distributing relay contacts, the said magnets are controlled to effect the punching of the numerical character "1" in statistical code. The punch magnet circuit established for the A punch if it was preselected for operation can be traced from conductor 200 through latch contacts CT1, floating cam contacts FC, conductor 201, conductor 302, AC3 contacts (Fig. 14D) now transferred if the A punch was preselected, conductor 220, contacts R40c, transferred contacts R45c, conductor 211 to the "1" punch selecting magnet 115, coil of relay DMR and conductor 203, energizing said magnet and relay. Relay DMR exercises no controlling effects at this time.

The punch selecting magnet circuit for the B punch is similar except that the impulse circuit is directed through the BC3 contacts (Fig. 14J) closed when the B punch is selected for operation.

As mentioned hereinabove, upon energization of the said punch selecting magnet and positioning of the related interposer, the punch contacts PC are closed to energize the punch magnet 124, whereupon a perforation is formed in the "1" index point position of the first card column, and the next card column is fed to the punching station. During the said feeding operation, the floating cam contacts FC are opened momentarily. Due to the opening of the said cam contacts FC, the holding circuit for relay R40 is broken, thereby restoring this relay and the associated contacts to the described normal condition.

Upon completion of the punching operation, cam contacts C1 are closed to again energize the latch magnet 63 and initiate another sensing operation. The next row of data designations in the telegraphic tape represents the numeral "2," therefore, upon sensing these designations, contacts 52 are effective (upon closure of cam contacts C3) to cause energization of translating relays R3, R4 and R8—R11. Similarly as described hereinabove, the translating relay contacts are effective, upon closure of cam contacts C2, to establish a circuit to the distributing relay R36, and permit a circuit to be completed, through contacts R36c, to conductor 212 and the "2" punch selecting magnet 115. Likewise, the "3" magnet 115 is selected and energized, upon the sensing of the code designations in the tape representing the numeral "3." In view of the detailed description up to this point, it is believed unnecessary to describe further numerical sensing operations.

7. Selection of "A" punch controlled by coded designation on tape

The preceding description outlined the operation of the machine for operating either the A punch or the B punch to represent the num- tioning the machine so that either the A or B punch may be preselected for punching operations and at this time the manner of operation controlled by an arbitrary signal preferably derived from the tape for selecting the A punch for operation will now be described.

Any suitable coded designation on the tape may provide the transmitted signal but herein the signal for selecting the A punch for operation consists of the coded designation representing figures case M. When the tape is in position for sensing of this coded designation which, it will be noted from Fig. 7A is represented by holes at the 3, 4 and 5 unit positions, relays R5, R6, R7, R8, R9, R10 and R11 (Fig. 14A) will be energized. Referring to Fig. 14B, relays R5, R6 and R8 transfer their related contacts and a circuit will be closed from line 200, to the CT1 contacts (Fig. 14A), wire 204, cam contacts C2, wire 206 (Fig. 14B), R3a contacts now normal, R4a, R5a, R6b and R8d contacts now transferred, through the R18 relay to the other line side 203. Hence, R18 relay will be energized for the duration of time that C2 contacts close. However, due to the normal opening of the AC2 contacts (Fig. 14R), the hold circuit is not completed even though the R18a stick contacts are closed. In a similar manner R18 relay for the B punch is energized but as will be evident hereafter, the R18 relay for the B punch is ineffective for the same purpose that the R18 relay for the A punch is.

Recalling now that the AA relay was energized in the previous tape sensing cycle (sensing of "figures") and at this time is still retained energized, a circuit will be closed from line 203, through the AB relay coil (Fig. 14D), thence through the AA1 contacts now transferred, the R18c contacts now closed, thence by wire 301 to the AC3 contacts now normal, wire 302 (Figs. 14C, 14B and 14A) to wire 201, the FC contacts, CT1 contacts to the line 200, thereby energizing the AB relay. The closure of the AB1 contacts (Fig. 14D) provides a holding circuit for the AB relay from line 203, relay AB, AB1 contacts now closed, AD1 contacts and wire 303 to wire 204 (Figs. 14C, 14B and 14A), CT1 contacts, to line 200. This retains the AB relay coil energized until the end of the card cycle of the A punch when the CT1 contacts open, or whenever the AD relay is energized, as will be described hereinafter.

At the end of the tape sensing cycle in which the coded designation for figures case M is sensed, cam contacts C4 (Fig. 14A, bottom center) close and with the AB2 contacts now closed a circuit is completed from the line 200, wire 304, cam contacts C4, AC relay, the AB2 contacts now closed, to line 203. AC relay closes its stick contacts AC1 to close an obvious stick circuit for the AC relay. The AC relay is the instrumentality which directly conditions the punch selecting circuits for the A punch so that the subsequent sensing of the coded designations representing the number 123 will be reflected in the corresponding perforating of the statistical card in the A punch. The AC relay effects this function by closing the AC2 contacts and thus completes the hold circuit for the selectively energized distributing relays R12 to R41 for the A punch. This hold circuit is from the line 200, CT1 contacts (Fig. 14A), FC contacts, wire 201, AC2 contacts now closed, AX1 contacts now normal, wire 305 (Figs. 14A, 14B and 14C) to which wire all of the "a" hold concontacts (Fig. 14D) and thereby enables the completion of the punch selecting magnet circuits through the "b" and "c" contacts of the distributing relays. This energizing circuit extends for the A punch from the line 200, through CT1 contacts, (Fig. 14A) FC cam contacts, wire 201, wire 302 (Figs. 14A, 14B, 14C, and 14D), thence through the AC3 contacts now transferred, to the wire 220, and thence through the "b" or "c" contacts of the energized distributing relays which, in accordance with their selective closure, will cause the selective energization of the punch selecting magnets 115 of the A punch. Thus, in the above described manner the A punch is selected for operation.

Figure 14J:
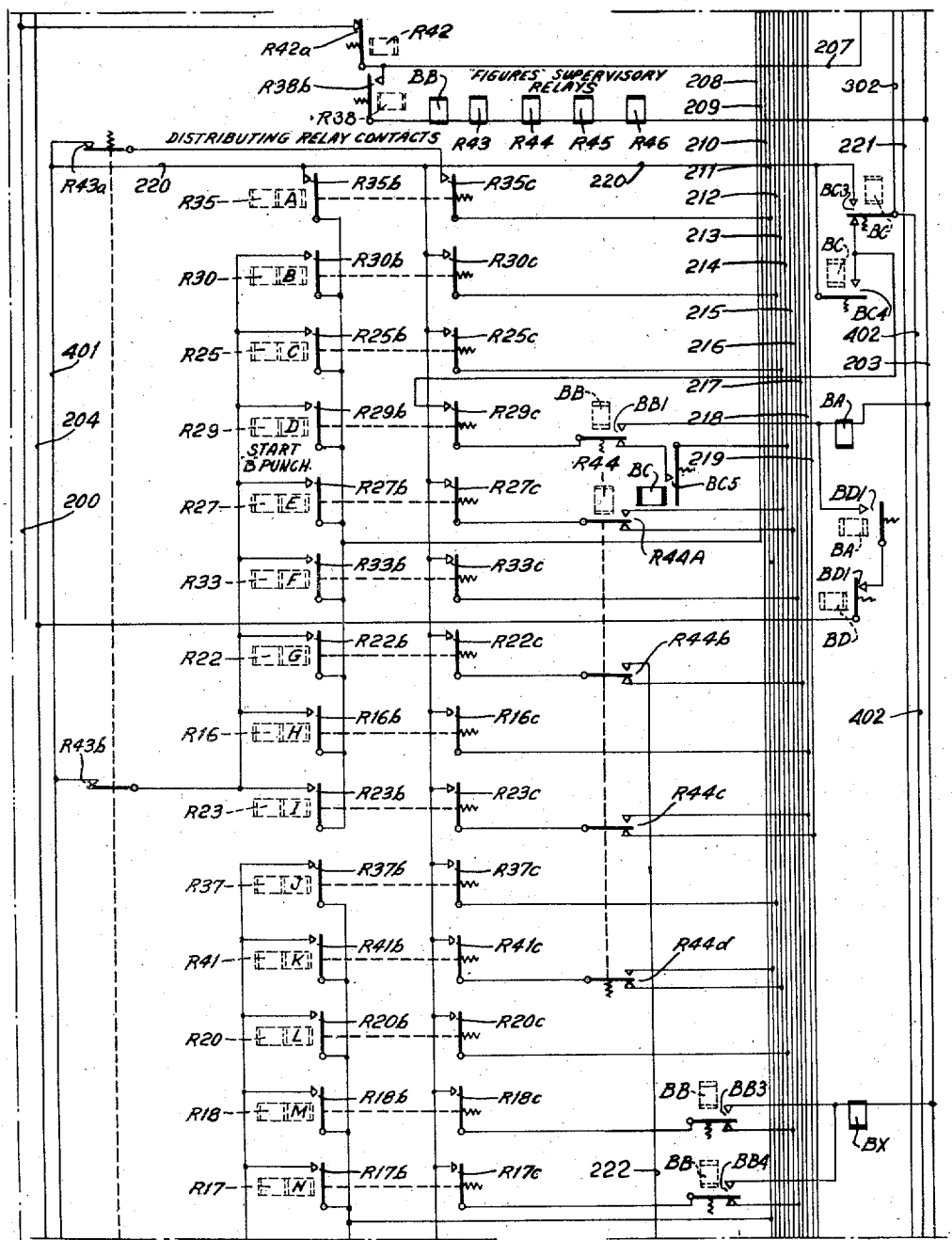
Figure 14K:
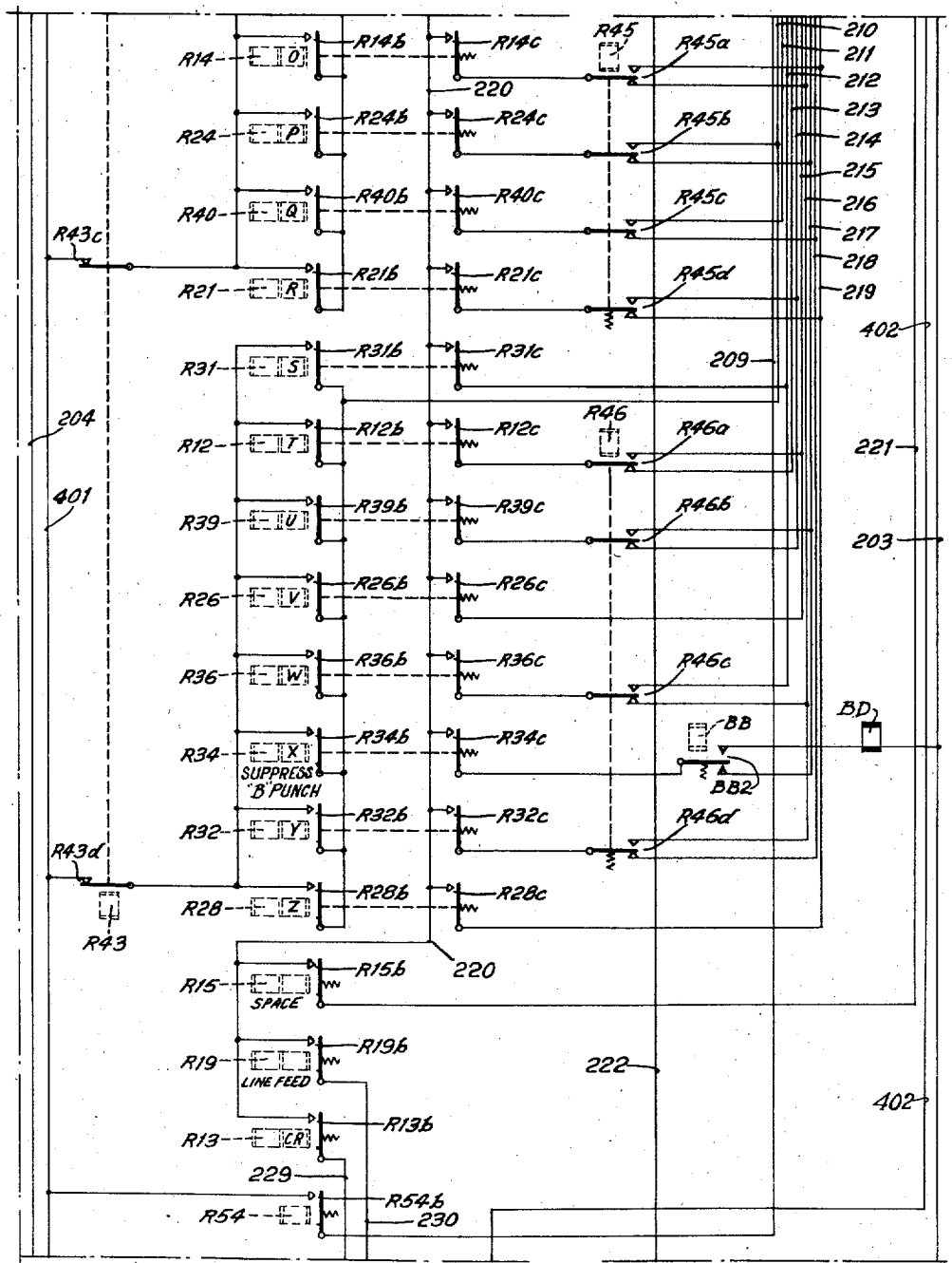

While it was previously intimated that the R18 distributing relay for the B punch is concurrently energized with the R18 relay for the A punch, it will be evident from Fig. 14J that while the BB3 contacts and the R18c contacts are now in operated position to close at the circuit at such points to the BX relay, the energizing circuit for such relay, is now open at the BC3 (Fig. 14J) contacts, since the BC relay has not been energized. Hence, the R18 relay for the B punch is ineffective. Referring to Fig. 14G, since the BC relay has not been energized, the BC2 contacts, which are similar to the AC2 contacts of Fig. 14A, are open and hence, while the distributing relays for the B punch are concurrently energized, they will be ineffective if only the A punch is to be operated, particularly since the BC3 contacts (Fig. 14J) are open to prevent completion of the punch selecting magnet circuits through the "b" and "c" relay contacts of the distributing relays for the B punch. Obviously, with the machine conditioned for operating the A punch, the sensing of the coded designations representing the number 123 will then only be perforated on the statistical card in the A punch.

It is at times desirable that the same information be also perforated on the statistical card in the B punch and the manner in which the circuits for the B punch are conditioned so as to also select the B punch for operation will now be described in detail.

8. Selection of "B" punch controlled by coded designation on tape

Any suitable coded designation may be utilized for selecting the B punch for operation and herein the coded designation representing figures case D will perform this function. Referring to Fig. 7A, this coded designation consists of holes at the 1 and 4 unit positions and accordingly under control of the tape sensing mechanism, relays R3, R6 and R7 will be energized. Referring to Figs. 14B, 14C, 14H and 14I, the transference of the R3a and R7a contacts will select both distributing relays R29 for energization. Both relays will close their respective contacts R29c and considering the R29 distributing relay for the A punch, a circuit will now be closed from line 203, through the AX relay coil (Fig. 14D) through the AA4 relay contacts now transferred, contacts R29c, wire 220, contacts AC3 previously transferred, wire 302 (Figs. 14D, 14C, 14B and 14A), wire 201, to line 200, energizing the AX relay. The AX relay, referring to Fig. 14A, opens AX1 contacts after the hold contacts or "a" contacts of any of the distributing relays close, thereby preventing the R29 distributing relay (Fig. 14c) related to the A punch from being held energized. After R29 relay is deenergized as a result of the opening of cam contacts C2, R29c contacts open, deenergizing the AX relay and the AX1 contacts (Fig. 14a) come to closed position.

Considering now the R29 distributing relay for the B punch, the latter closes its "a" hold contacts but due to the opening of the BC2 contacts (Fig. 14G) in the holding circuit for the distributing relays, such relay is not held energized by its holding circuit but by its energizing circuit only for the duration of the closure of the C2 contacts. Referring now to Fig. 14J when R29c contacts close, a circuit will be closed from line 203, through the BA relay, thence through the BB1 relay contacts now transferred, R29c contacts now transferred, BC3 contacts now in the normal position shown, wire 302 (Figs. 14J, 14I, 14H and 14G), wire 201, FC contacts, CT1 contacts, back to line 200. The holding circuit for the BA relay is completed from the line 203, through the BA relay (Fig. 14J) BA1 stick contacts, BD1 contacts now closed, wire 204 (Figs. 14J, 14I, 14H and 14G), CT1 contacts to line 200. Hence, the BA relay will be held energized until the BD relay coil is energized or when CT1 contacts open at the termination of the punch cycle of the B punch.

Referring to Fig. 14A with the BA2 contacts closed when cam contacts C4 close, a circuit will be closed from line 200, through cam contacts C4, BC relay, the BA2 relay contacts to line 203. The hold circuit for the BC relay obviously extends back to the line 200 through the BC1 contacts. BC relay may be considered as the instrumentality for rendering the distributing relays for the B punch effective and thereby select the B punch for subsequent statistical card perforating operations. This function is effected in the same manner as explained for the AC relay, namely, the BC relay closes the BC2 relay contacts (Fig. 14G) to enable the selectively energized distributing relays to be held energized through their holding circuits. The BC3 contacts function in the same manner as explained for the AC3 relay contacts, namely, they connect the b and c contacts of the distributing relays to the line 200, enabling the distributing relays to selectively energize the punch selecting magnets of the B punch.

At this point in the operation of the machine, the A punch has been previously selected for operation upon the receipt of the appropriate signal and the B punch has just been selected for operation by receipt of the appropriate signal. Thereafter tape sensing operations successively ensue so that the statistical cards in the A punch and the B punch are perforated at columns 1, 2 and 3 to represent in statistical code the digits 1, 2, 3.

It is explained that the signal for selection of the B punch may precede the signal for the selection of the A punch with the same final result. In the event that in sensing said tape the signal for the selection of the A punch comes second, then in such instance the R18 distributing relay selectively energized by the transmission of the figures case M coded designation will close its R18c contacts (Fig. 14J), effecting the energization of the BX relay by the same circuit arrangement described for the AX relay. BX relay opens the BX1 contacts which function as described for the AX1 contacts of the AX relay, i. e., it prevents the B punch from being disconnected when the A punch is selected for operation.

The manner of effecting statistical card punching operations for the number 123 has been previously described in detail and therefore its operation need not be repeated.

8. *Alphabetical data*

The next data recorded on the telegraphic tape belongs to the alphabetical group, and accordingly is preceded by the "letters" key code designation. Upon sensing the coded group of perforations on the tape for this key code, and upon closure of cam contacts C3 (Fig. 14A), the translating relays R3—R11 are energized.

Upon closure of cam contacts C2, a circuit is completed for each punch by identical circuits from line 200 through latch contacts CT1, conductor 204, cam contacts C2, conductor 206, the transferred translating relay contacts R3a, R4b, R5d, R7d, and R11d to the coil of the "letters" relay R42 (Fig. 14C and Fig. 14I) and line 203, energizing each of said relays. Opening of the contacts R42a breaks the holding circuit to the "figures" relay R38, and consequently causes de-energization of the "figures" supervisory relays R43—R46, the AA (Fig. 14D) and BB (Fig. 14J) relays. Now, upon sensing the code designations for the character "J," the "1," "2" and "4" contacts 52 permit the translating relays R3, R4, R6 and R7 to be energized, upon closure of cam contacts C3. Closure of cam contacts C2 then establishes a circuit through the transferred contacts R3a, R4b, normally closed contacts R5d, transferred contacts R7c, and normally closed contacts R11b to the coil of the "J" distributing relay R37 of the selected punches. The related distributing relay contacts R37b and R37c are then closed to establish a circuit from the floating cam contacts FC through conductor 201, wire 302, BC3 or AC3 contacts now transferred, wire 220, wire 401, contacts R43c, R37b to conductor 209 and the "X" punch selecting magnet 115, and by means of contacts R37c another circuit is established to the conductor 211 and "1" punch selecting magnet 115, thereby causing perforations to be formed in the "X" and "1" index point positions for representing, in statistical code, the character "J." It is to be noted, that the circuits controlled by the distributing relay contacts remained conditioned as described, that is, contacts R43a—R43d remain closed, and contacts R44a—R44d, R45a—R45d and R46a—R46d remain untransferred, during the subsequent sensing operations, until a subsequent "figures" key code designation is sensed.

Accordingly, during subsequent sensing operations, the sensing contacts 52 are controlled to govern the successive selections of the R14, R16 and R17 distributing relays, which relays, in turn, control the selections of and operations effected by, the punch selecting magnets 115, so that the fifth to seventh card columns are perforated by the selected punches successively in the "X" and "6," "R" and "8," and "X" and "5" index point positions, respectively, for representing, in statistical code, the "0," "H," and "N" alphabetical characters. In view of the detailed description up to this point, it is believed unnecessary to describe further alphabetical sensing operations.

*Space operations.*—In the instant case, it is desired to effect spacing of the card carriage, in the A and/or B punch unit, each time a "space" designation is sensed in the telegraphic tape. Upon sensing a "space" code designation, the "3" sensing contacts 50 are closed to establish a circuit to the translating relay R5, upon closure of cam contacts C3. Upon closure of cam contacts C2, a circuit is completed from the line 200, CT1 contacts through the said cam contacts C2, conductor 206, normally closed contacts R3a and R4a, transferred contacts R5a, normally closed contacts R6b and R8C to the "space" distributing relay R15. A holding circuit is established for this relay through contacts R15a, wire 305, AX1 contacts, AC2 contacts now transferred, conductor 201 and the cam contacts FC, CT1 contacts, to line 200, precisely as traced hereinbefore. The contacts R15b (Fig. 14E or Fig. 14K) are now effective to connect the cam contacts FC, by means of conductor 220, to conductor 221 and each punch magnet 124, energizing this magnet and spacing both card carriages one step, to present the next column of each card to the punching station. During operation of the punch escape mechanism, the cam contacts FC are opened to break the described holding circuit to space control relay R15.

It is to be noted, that, during spacing operations in the instant case, the "figures" supervisory control circuits and circuits controlled by the AA and BB relays are not disturbed, by this it is meant, that the circuit to the "figures" relays R43—R46 is not broken, but maintained closed through contacts R42a and R38b, until a "letters" key code is presented to the sensing station. Thus, it is seen, that, whenever a "space" signal appears between data designations of the numerical or alphabetical group, it is not necessary to repeat the "figures" or "letters" key code after the "space" signal in the telegraphic tape.

9. *Punch magnet selection in designating letters case M in statistical code*

In view of the fact that the normal energizing circuits for punch selecting magnets under control of the R18c distributing contacts for both card punches have, in the present machine, been changed from the corresponding energizing circuit in Patent No. 2,340,801, additional means is included herein to enable punch magnet selection under control of such distributing relay contacts when perforating alphabetical data.

The punch magnet selecting circuit is required to be completed in perforating the statistical card to represent in combinational holes the letter M which, as shown in Fig. 8, is represented by a hole at the 4 index point position and a pilot hole at the X index point position.

When the machine has been conditioned for perforating alphabetical data as just outlined in this section of the description, the AA relay (Fig. 14D) has been deenergized to bring the AA1 contacts to the normal position shown in the drawings and at this time the AC5 relay contacts (Fig. 14D) are also closed. Under control of the coded designations on the tape representing figures case M, R18 relay will be energized to close the R18b and R18c contacts and the former will complete in the normal manner the energizing circuit to the X punch selecting magnet 115 (Fig. 14A). The energizing circuit through the R18c contacts will be completed from wire 302, the AC3 contacts (Fig. 14D) now normal, wire 301, through the R18c contacts, through AA1 contacts now in normal position, the AC5 contacts now closed, to wire 214 which, as shown in Fig. 14A, is connected to the punch selecting magnet for perforating the statistical card at the 4 index point position. Thus, normal punch selecting circuits are provided to enable the normal alphabet perforation operation of the A punching machine.

In a corresponding manner, the circuit for punch magnet selection for the B punch is completed through the R29c contacts (Fig. 14J), BB1 contacts now at normal position, the BC5 contacts now closed, to line 214, thence to the punch selecting magnet 115 (Fig. 14G) for perforating the card in the B punch at the 4 index point position.

10. Signal to effect suppression of operation of the "A" punch

When card columns 4 to 15, inclusive of the card fields of the card in the A and B punches have been perforated to represent the alphabetical data, a position of the tape 25 is reached where the "figures" coded designation is sensed and the machine is again conditioned for perforating numerical data as previously described. This, it will be recalled, is effected by the energization of the figures supervisory relays R43—R46 for both the A and B punches. At the same time the AA control relay (Fig. 14D) and the BB control relay (Fig. 14J) are energized. After so conditioning the machine the next column position of the tape 25 is reached in which a signal is transmitted under control of the tape sensing means to suppress the operation of the A punch only.

It will be assumed at this time that the numerical data 567 is to be punched only on the tabulating card in the B punch as shown in Fig. 7C but such punching is to be suppressed in the A punch. The preferred signal for suppressing the operation of the A punch consists in the present machine of the figures case N. This will result in the energization of the R17 distributing relays for both punches. Relay R17 for the B punch closes its R17c contacts (Fig. 14J) and with BB4 contacts now transferred the BX relay is energized, such energizing circuit being from the line 203, BX relay, BB4 contacts, R17c contacts, wire 220, BC3 relay contacts previously closed because of the previous selection of the B punch, wire 302 (Figs. 14J, 14I, 14H and 14G), wire 201, FC contacts, CT1 contacts, to line 200. The R17b contacts are ineffective to close a punch magnet selecting circuit because R43c contacts (Fig. 14K) are open. The BX relay will open the BX1 contacts (Fig. 14G) before the R17a hold contacts (B punch) close, which, as previously described, is provided for the purpose of preventing the completion of the holding circuit of the R17 distributing relay of the B punch. This will enable the B punch to remain connected for statistical card perforating operations to represent 567 in columns 16, 17 and 18 (see Fig. 7C).

Suppression of card punching by the A punch is effected by the closure of the R17c (Fig. 14D) contacts of the R17 distributing relay. R17b contacts are ineffective because R43c contacts (Fig. 14E) are now open. The closure of contacts R17c completes a circuit from the line 203, the AD relay (Fig. 14D), AA2 contacts now transferred, R17c contacts, wire 220, AC3 contacts now transferred due to the previous selection of the A punch, wire 302 (Figs. 14D, 14C, 14B and 14A), wire 201, FC contacts, CT1 contacts to line 200. The opening of the AD1 (Fig. 14D) contacts will break the holding circuit for the AB relay and the latter relay in turn will open its AB2 contacts (Fig. 14A), breaking the holding circuit for the AC relay, which latter enables its AC3 contacts (Fig. 14D) to return to normal and its AC2 contacts (Fig. 14A) to come to normal open position. The former prevents completion of the punch magnet selecting circuits for the A punch, even though the distributing relays are selectively energized when punching operations by the B punch are effected. The latter or AC2 contacts also prevent the distributing relays from being held energized, even though they are selectively energized concurrently with the distributing relays for the B punch.

When the card field for the card in the B punch is perforated to represent the numerical data 567, it will be assumed that at this point in the operation of the machine the B punch is suppressed in its operation and thereafter the A punch is again called into operation, resulting in the perforation of card columns 16, 17 and 18 of the numerical data 890 on the card in the A punch unit.

11. Signal to effect suppression of operation of the "B" punch

The suppression of the B punch, after it has been utilized for statistical card punching operations, is performed by the sensing of coded designations on the tape 25 representing figures case X. The sensing of such coded designations will, according to the code on the perforated tape, result in the energization of the R34 distributing relays (Figs. 14C and 14I) for both the A and B punches. Considering now the closure of the distributing relay contacts R34c for the A punch, a circuit will be closed from line 203, through the AX relay (Fig. 14D), thence by wire 306 (Figs. 14D and 14C), through the AA3 contacts now transferred, R34c contacts, wire 220, AC3 contacts now closed since the A punch was previously selected for operation, wire 302 (Figs. 14C, 14B, 14A), wire 201, FC contacts, CT1 contacts to line 200, thereby energizing the AX relay. The latter opens its AX1 contacts (Fig. 14A) to prevent completion of the holding circuit for the R34 relay and thereby enabling the A punch to remain connected for card punching operations if it was previously selected. Considering now the R34 distributing relay for the B punch, the latter will close its contacts R34c (Fig. 14K), thereby completing an energizing circuit from line 203, through BD relay coil, (Fig. 14K), through BB2 contacts now transferred, R34c contacts now closed, wire 220, thence through BC3 contacts now transferred since the B punch was previously selected for operation, wire 302 (Figs. 14J, 14I, 14H and 14G) wire 201, FC contacts, CT1 contacts to line 200. The BD relay will open the BD1 contacts (Fig. 14J), breaking the holding circuit for the BA relay and the latter in turn will open its BA2 contacts (Fig. 14A), breaking the holding circuit for the BC relay. Deenergization of the BC relay will enable the BC2 (Fig. 14G) contacts to open and the BC3 contacts (Fig. 14J) to be transferred to normal position. The normal positioning of the contacts controlled by the BC relay as shown in the drawings is the condition necessary where the B punch is ineffective for statistical card punching operations.

Summarizing, the condition of the machine is now such that both the A and B card punches are disconnected for card punching operations. It will now be assumed that the next numerical data, viz., the number 890, is to be perforated on only the statistical card in the A punch as shown in Fig. 7B and is not to be perforated in the corresponding card field of the card in the B punch.

To this end a signal is transmitted under control of the tape to again select the A punch for operation in view of the fact that it was previously suppressed.

The signal which is transmitted for selecting the A punch for operation is the coded designation representing figures case M.

The manner of operation of the machine for connecting the A punch by such designation has been previously described in detail in section 7 and reference to this section may be had for details of operation of the machine which will be carried out at this point.

After the A punch machine has been connected for operation, successive tape sensing operations occur so that the A punch will punch the numerical data 890, in columns 16 to 18, as shown in Fig. 7B.

12. *Suppression of operation of both punches "A" and "B"*

It is preferable at times to eliminate or suppress the operation of both punch A and punch B. To exemplify this possibility it will be assumed that the numerical data 143 designated on the tape (Fig. 7A) is not to be reproduced on the statistical cards of either the A or B punch. Suppression of either punch is carried out as previously described, by means of the figures case M signal to suppress the A punch and the figures case X signal to suppress the B punch, in the event either punch was selected for operation.

In the assumed example, after perforating the statistical card in the A punch to represent the number 890, the code designation on the tape representing figures case M transmits the signal to suppress the operation of the A punch in the manner described in full detail in section 10. This signal is transmitted in view of the previous utilization of the A punch to perforate the card to represent the number 890.

Obviously, if the B punch was previously in operation, a following signal representing figures case X is transmitted to suppress the operation of the B punch. In the assumed example the B punch was previously suppressed so that the figures case X signal represented on the tape in Fig. 7A is unnecessary. However, for safety purposes it is desirable that the operator perforate the tapes to represent both punch suppressing signals and this is exemplified in the figures case signals N and X which follow the number 890 (see Fig. 7A). Therefore, during the successive tape sensing operations which are not interrupted the coded designation on the tape representing number 143 will be ineffective to control card punching operations of either the A or B punch and the card carriage of both punches remain at rest at column 19.

Thereafter, successive signals are transmitted under control of the tape which consists of figures case M and figures case D, both of which successively condition the A and B punches with the result that under control of the coded designations representing the number 456 on the tape, the cards in both the A and B punches will be perforated in statistical code to represent this number. At this point in the operation of the machine column spacing of the cards of both carriages ensues and at column 22 position of the column readout the following operation takes place.

13. *Column checking operations*

In order to determine whether all the functional operations of the tape sensing and card perforating units are completed in unison, so-called column checking circuits are provided. By this arrangement, it can be determined whether or not the card carriage is finally positioned, in the column it normally should occupy, after completion of the sensing of the information on a predetermined section of the telegraphic tape. This is accomplished by employing a pattern or master card M (Fig. 9), disposed in the duplicating rack, which card is provided with an "X" perforation in the column corresponding to the column position whereat the card carriage should be positioned, upon completion of punching the information sensed on the tape. If this predetermined position is occupied by the card carriage, upon completion of the punching operations, an "X" perforation is punched in the record card (see Figs. 7B, 7C), and the card carriage is automatically skipped to the last column position.

To continue with the chosen example, assume that columns 19–21 inclusive are punched on the cards in punches A and B with information sensed on the telegraphic tape, which operations are fully understood at this point, and that column 22 is used for the mentioned checking purposes. Accordingly, for each punch a plug connection is provided from the "22" conducting segment 167 to the "column check" plug socket, as indicated by plug connector 227 in Figs. 14F and 14L. Upon closure of the cam contacts FC (which occurs after the card carriage is positioned to the "22" column), a circuit is established for each punch from conductor 200 to latch contacts CTI, said contacts FC, conductor 401, wire 302, AC3 contacts (Fig. 14D) or BC3 contacts (Fig. 14J) both now transferred, wire 220, pickup coil of relay R49, plug connector 227, the "22" conducting segment 167, brushes 168, common conducting strip 166 to line 203, energizing said relay. A holding circuit is established immediately from the latch contacts CTI, conductor 204, holding coil of relay R49, contacts R49b, conductor 228 to conductor 203, which is maintained until the latch contacts CTI are opened. Contacts R49a (Figs. 14A and G) are opened to break the circuit to the brush contact roll 175 of the card duplicating mechanism. In this manner, the "X" punch selecting magnet 115 is not energized presently, under control of the "X" perforation in the master card M. This control function is a positive one, in view of the fact, that relay R49 is faster in its operation than the said punch selecting magnet, thus, before the latter is effectively energized, the operation of relay R49 is completed to cut off the circuit to this punch selecting magnet.

Now, upon sensing the "carriage return" code signal in the tape (Fig. 7A) (which, it is remembered, always follows the last item of information in a line punched in the telegraphic tape), the "4" sensing contacts 52 are closed to effect energization of relays R6 and R7. A circuit is then completed, upon closure of cam contacts C2, from the latch contacts CTI to conductor 204, said contacts C2, conductor 206, normally closed contacts R3a, R4a, R5a, transferred contacts R6a, and normally closed contacts R8b to the pickup coil of the "CR" distributing relay R13 (Figs. 14B and 14H) and conductor 203. A holding circuit for this relay is established immediately through its contacts R13a, wire 305, BX1 or AX1 contacts (Figs. 14G and 14I), BC2 or AC2 contacts (Figs. 14G and 14I) wire 201, the floating cam contacts FC, CTI contacts, to line 200. Closure of contacts R13b (Figs. 14E and 14K) permits a circuit to be completed from the latch contacts CT1 to cam contacts FC, conductors 201, 302, AC3 or BC3 contacts (Figs. 14D and 14J), wire 220, said contacts R13b, (Figs. 14E and 14K), conductor 229, pickup coil of relay R50 (Figs. 14F and 14L), connector 217, the "22" conducting segment 167, brushes 168, common conducting strip 166 to conductor 203, energizing each of said relays. A holding circuit is established immediately from the latch contacts CT1 via conductor 204 and contacts R50a to conductors 228 and 203.

Obviously, relays R50 could not be picked up, at this time, if the card carriage of either punches rested at any other position than the column "22" position. Upon energization of relays R50 the contacts R50b are transferred for the following control purposes. After sensing the "carriage return" code signal (Fig. 7A), it is remembered, that a "line feed" signal follows immediately thereafter, which "line feed" signal when sensed causes the translating relay R4 (Fig. 14A) to be picked up, through the "2" sensing contacts 52. Upon closure of cam contacts C2, the latch contacts CT1 are connected by the said contacts and conductor 206 to normally closed contacts R3a, transferred contacts R4a, normally closed contacts R5b, R6c, and R9a to the "L. F." distributing relay R19 pickup coil, (Figs. 14B and 14H) energizing this relay. The usual distributing relay holding circuit through contacts R19a and the holding coil of relay R19 is immediately established. A circuit is then completed from the floating cam contacts FC through conductors 201, 302, AC3 or BC3 contacts (Figs. 14D and 14J) wire 220, contacts R19b (Figs. 14E and 14K), conductor 230, transferred contacts R50b, pickup coil of each relay R52 (Figs. 14F and 14L) and conductors 228 and 203, energizing said relays. A holding circuit from latch contacts CT1 is established via conductor 204, holding coil of relay R52, contacts R52c and conductors 228 and 203.

Opening of contacts R52b (Figs. 14A and 14G) breaks the described holding circuit for related relay R2, and in turn, causes the circuit to the latch magnet 63 to be opened, so that further tape sensing and feeding operations are suspended. Closure of contacts R52a permits a circuit to be established from conductor 200 to latch contacts CT1, floating cam contacts FC, said contacts R52a (Figs. 14A and 14G, top), contact roll 175, "X" brush 176 to the "X" punch selecting magnet 115. This magnet is now effectively energized to cause an "X" perforation to be punched in the "22" column in the cards in the A and B punches (Figs. 7A and 7B). A circuit is also completed from the "X" brush 176 (Figs. 14A and 14G) to normally closed contacts R47a and relay R1, energizing this relay, and by means of contacts R1b causing the skip relay SR to be energized, as described hereinabove, thereby causing the skip magnet to be energized. Thus, by means of a suitable skip bar, the card is skipped to the last column position to effect closure of the last column contacts LC.

As mentioned, had the card carriages of both punches not been properly positioned, after punching of the information sensed on the telegraphic tape, both relays R50 could not have been energized to permit the described controlling circuits to be established. The non-unison operations of the tape sensing and card punch units A and B are positively detected by establishing a circuit, upon sensing of the said "line feed" signal, from the "L. F." distributing relay contacts R19b (Figs. 14E and 14K) via conductor 230, normally closed contacts R50b, coil of relay R51 and conductors 228 and 203, energizing this relay. Contacts R51a, included in the holding circuit for relay R2 (Figs. 14A and 14G), are then opened to break this holding circuit, and prevent further energization of the latch magnet 63. Thus, it is seen that further tape sensing and feeding operations are arrested until such time when the apparatus receives the attention of an operator for correcting the faulty condition.

Now, resuming with the closure of the last column contacts LC, a circuit is completed to the eject magnet 143, (Figs. 14A and 14G), energizing this magnet and initiating the described and well known card ejecting operations for both punches. The automatic start contacts AC are closed, during card ejection operations, to effect energization of the trip magnet 153 of each punch. Upon energization of the trip magnet, it is remembered, the latch contacts CT1 are opened and CT2 are closed. Latch contacts CT1 open the stick circuits for relays AB (Fig. 14D) and 3A (Fig. 14J) which open their respective contacts AB2, BA2 (Fig. 14A) to deenergize the AC and BC relays to disconnect both punches. The CT2 contacts close a circuit to the punch motor M, whereupon the card carriage for each punch is returned to pick up a new card from the hopper and is positioned in the first column position. It should have been stated, that, when the card carriage is skipped to the last column position, the floating cam contacts FC are opened, and are held open, as is well known, until the card carriage is in the first column position. Opening of the said cam contacts FC breaks the mentioned holding circuits to the said distributing relays R13 and R19. Opening of latch contacts CT1 breaks the holding circuits to said relays R49, R50 and R52. In this manner, the apparatus of each punch is now restored to normal, and conditioned for further automatic tape sensing and card perforating operations, which operations are effected as described herein upon the positioning of the next card to the first column position.

While there have been shown and described and pointed out the fundamental novel features of the invention as applied to a single modification, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a recording system, the combination of a plurality of structurally separate recording machines, each including instrumentalities to effect as said instrumentalities are selected character by character recording operations, means for analyzing in succession groups of data on a master sheet and the columns of data of each group in succession, means controlled by said analyzing means to select said recording instrumentalities for character by character recording as the data of a group is analyzed, and programming means automatically operable as said master sheet is analyzed to initiate the recording operation of said recording machines for a group of data under control of said analyzing means separately or jointly, and upon completion of recording said group of data suppress the operation of the recording machines jointly, or separately, and if separately to continue character by character recording of a following group of data by the recording machine retained in operation.

2. In a recording system, the combination of a plurality of structurally separate recording machines, each including recording instrumentalities to effect as said recording instrumentalities are selected character by character recording operations, means for analyzing in succession groups of data on a master sheet, and the columns of data of each group in succession, means controlled thereby to select said recording instrumentalities for recording operation as the columns of data of a group are analyzed, and programming means automatically operable prior to the analysis of a group of data on said master sheet for rendering said recording machines to be operable to record said group of data under control of said analyzing means separately or jointly, as said master sheet is analyzed, and upon completion of recording said group of data to suppress the operation of the recording machines jointly, or to retain one operable to continue recording of a following group of data.

3. In a recording system, the combination of a plurality of structurally separate recording machines, each including recording instrumentalities to effect as said instrumentalities are selected for operation character by character recording operations, means for analyzing columns of data on a master or pattern sheet in succession to select said instrumentalities for recording, and programming means including recording machine initiating means automatically operable prior to analysis of a related group of columns of data on said master sheet for rendering said machines separately or jointly operable under control of said analyzing means, and including further recording machine operation suppressing means operable upon the beginning of the analysis of the next group of related columns of data on said master sheet to separately or jointly suppress the operation of the recording machine or machines which were in operation.

4. In a recording system, the combination of a plurality of structurally separate recording machines, each including recording instrumentalities to effect as said instrumentalities are selected for operation character by character recording operations, means for analyzing groups of data on a master or pattern sheet for commonly or selectively controlling said recording machines by concurrently selecting the same recording instrumentalities of said machines jointly, or of a single machine separately, and programming means including recording machine initiating means operable prior to analysis of certain groups of data on said master sheet for rendering said machines concurrently and jointly operable under control of said analyzing means to record a group of data, and further recording machine operation suppressing means operable upon completion of the analysis of said group of data on said master sheet to suppress the operation of either recording machine under control of said analyzing means prior to the analysis of a following group of data, whereby the remaining recording machine records said following group of data.

5. In a recording system, the combination of means for analyzing a master sheet having data representing designations and "start" and "stop recording" designations demarcating said data representing designations, a plurality of recording machines, each including "start recording" control means and "stop recording" control means responsive to different start and stop recording designations, and means for conditioning the related control means to be responsive to the associated "start recording" and "stop recording" designations to condition the related recording machine to be operable to record under control of the master sheet analyzing means to record data which represents the data designations analyzed, and to terminate the recording of said data when said analyzing means senses a "stop recording" designation associated with the recording machine in operation.

6. In a recording system, the combination of means for analyzing a master sheet having data representing designations and "start" and "stop recording" designations demarcating said data representing designations, a data recording machine including "start recording" control means and "stop recording" control means, and means controlled by said analyzing means when a special designation is sensed to render the respective control means responsive to the "start recording" and "stop recording" designations to initiate the operation of the recording machine to record under control of said master sheet analyzing means data which represents the data designations analyzed, and to terminate the recording of said data when said analyzing means senses a "stop" designation.

7. In a recording system, a plurality of recording machines, means for analyzing a master sheet, start recording and stop recording control means for each recording machine, and means comprising start and stop signal designations on said master sheet which are different for each recording machine to render the associated start recording and stop recording control means effective as said signals are analyzed by said analyzing means and as they occur on said master sheet.

8. In a recording system, a plurality of recording machines, means for analyzing a master sheet, start recording and stop recording control means for each recording machine, and means comprising start and stop signal designations on said master sheet which are all different for the recording machines to render the start recording control means for both machines effective as said start recording signals are successively analyzed by said analyzing means, and to render the stop recording control means for both machines effective as said stop recording signals are successively analyzed by said analyzing means.

9. In a recording system, the combination of means to analyze a master sheet to pick up data to be selectively recorded on separate recording sheets, a plurality of recording machines to effect character by character recording on said recording sheets, and programming means operable as said master sheet is analyzed to effect the operation of said recording machines under control of said analyzing means jointly or selectively whereby either or all recording machines are operable to record data picked up from the master sheet, and operable upon completion of the analysis of data on the master sheet to suppress the operation of one, all of said recording machines, or none at all, whereby subsequently picked up data in said master sheet is transposed to the recording sheet of all but one recording machine, on all recording sheets of all recording machines, or none at all.

10. In a recording system, the combination of means to analyze a master sheet to pick up coded data to be selectively recorded in another code on separate recording sheets, a plurality of recording machines to effect character by character recording on said recording sheets, code converting means intermediate the master sheet analyzing means and said recording machines, and programming means operable as said master sheet is analyzed to initiate the operation of said recording machines jointly or selectively under control of said code converting means whereby either or all recording machines are operable to record in said other code data picked up from the master sheet, and operable upon completion of the analysis of data on the master sheet to suppress the operation of one, all of said recording machines, or none, whereby subsequently picked up data on said master sheet is recorded under control of said code converting means in said other code on the recording sheet of all but one recording machine, on all recording sheets of all machines, or none at all.

11. In a recording system, the combination of a plurality of recording machines, each for recording data selected from a master sheet on a related record sheet, means for analyzing data on said master sheet, recording instrumentalities for each recording machine and controlled by said analyzing means to transpose selected data on the master sheet to a record sheet of the recording machine set in operation, and programming means operable as said master sheet is analyzed and under control of designations thereon for rendering the recording instrumentalities of said recording machines jointly and concurrently responsive or individually responsive to said analyzing means for recording data selected from said master sheet on the record sheet or sheets, and for suppressing the operation of the recording instrumentalities upon completion of recording on the record sheet or sheets.

12. In a recording system, the combination of a plurality of recording machines, each for perforating a sheet to represent in one code data derived from a master sheet perforated in another code, means for analyzing perforated data on said master sheet, recording instrumentalities for each recording machine, code converting means controlled by said analyzing means to convert selected perforated data on the master sheet to said other code on the record sheet of the recording machine, and programming means comprising start and stop signal transmitting means operable under control of said master sheet analyzing means for rendering the recording instrumentalities of said recording machines concurrently responsive to said code converting means when start signals for each recording machine are transmitted, or individually responsive to said code converting means when one of said start signals is transmitted, and for suppressing the operation of the recording instrumentalities under control of said code converting means upon transmission of a stop signal for each recording machine.

13. In a tape controlled recording system, the combination of a plurality of distantly located, structurally separate card perforating machines, each to effect in a punching cycle by perforating instrumentalities the column by column perforation of said card to designate data in one code, a data transmitting means comprising means to analyze the perforations on said tape arranged according to another code, means including code translating and converting means controlled by said analyzing means to selectively operate said card perforating instrumentalities, and programming means for rendering said code translating and converting means effective to selectively operate the recording instrumentalities of either or both card perforating machines to record on either or both cards coded data picked up from said tape, and operable during analysis of other data on the tape to suppress the card perforating operations.

14. In a tape controlled recording system, the combination of a plurality of distantly located, structurally separate card perforating machines, each to effect by perforating instrumentalities the column by column perforation of said card to designate data in one code, data and signal transmitting means comprising means to analyze the perforations in said tape arranged according to another code, means including code translating and converting means controlled by said analyzing means to selectively operate said card perforating instrumentalities, and programming means comprising part of said code converting means for rendering upon the receipt of one or more successive start signals from said analyzing means the perforating instrumentalities of either or both card perforating machines operable to record on either or both cards data picked up from said tape, and upon receipt of one or more stop signals to suppress the operation of the perforating instrumentalities of the selected card perforating machine to suppress the card perforating operations therein.

15. In a recording system, means for analyzing groups of data on a master sheet, a plurality of statistical card perforating machines operable to perforate fields of cards therein, each of said card perforating machines including perforating instrumentalities, programming means for transmitting as said master sheet is analyzed start and stop signals distinctive with respect to each other for each card perforating machine, and means controlled thereby for selectively conditioning the related card perforating machines to be operable with respect to its perforating instrumentalities to perforate a field of the card to designate the same information picked up from said master sheet, and upon receipt of a stop signal to suppress the card perforating operation during analysis of certain other data on said master sheet.

16. In a recording system, means for analyzing groups of data on a master sheet, a plurality of statistical card perforating machines operable to perforate fields of cards therein, each of said card perforating machines including perforating instrumentalities, programming means for transmitting under control of said analyzing means start and stop signals derived from said master sheet, which signals are distinctive with respect to each other for each card perforating machine, and means controlled thereby for selectively conditioning each card perforating machine to be operable with respect to its card perforating instrumentalities between the transmission of related start and stop signals to perforate a field of the card to designate the same information picked up from said master sheet and demarcated by such start and stop signals, and upon receipt of a stop signal to suppress the card perforating operation during analysis of certain other subsequent data on said master sheet.

17. In a recording system, the combination of means for analyzing start and stop designations, and data representing designations on a master sheet, which data are to be transposed from and recorded on statistical cards, a plurality of statistical card perforating machines, each including card perforating instrumentalities, start and stop control means for each card perforating machine, and means controlled by said analyzing means upon sensing start and stop designations distinctive for each machine and which demarcate data representing designations on said master sheet for rendering upon sensing said start designation said start control means effective to cause said card perforating instrumentalities of the selected card perforating machine to be operable during the analysis of said data representing designations, and upon sensing said stop signal designations to cause said stop control means to be effective to terminate card perforating operations.

18. In a recording system, the combination of means for analyzing start and stop designations, and intermediate data representing designations on a master sheet which data are represented in one code and are to be transposed from and recorded on statistical cards in a statistical code, a plurality of statistical card perforating machines, each including card perforating instrumentalities and related translating and code converting means, start and stop control means for each card perforating machine, and means controlled by said analyzing means upon sensing start and stop designations distinctive for each machine and which demarcate data representing designations on said master sheet for rendering upon sensing said start designation said start control means effective to cause said card perforating instrumentalities of the selected card perforating machine be operable under control of the related code converting means during the analysis of said data representing designations, and upon sensing said stop signal designation to cause said stop control means to be effective to terminate card perforating operations.

19. In a recording system, the combination of at least two recording machines, each including recording instrumentalities, and each including a start recording control means and a stop recording means responsive to start and stop signals on a master sheet, means for analyzing data representing designations on said sheet and designations representing said signals, means controlled by said analyzing means upon the occurrence of one or more successive start signals to condition the start control means of the related recording machines operable to render the recording instrumentalities thereof responsive to record data under control of the subsequently analyzed data representing designations, and further means controlled by said analyzing means upon the occurrence of a stop signal following the data representing designations to condition the stop control means operable to render the recording instrumentalities unresponsive to further analyzed data representing designations on said master sheet.

20. In a recording system, the combination of at least two recording machines, each including recording instrumentalities, and each including a start recording control means and a stop recording means responsive to start and stop signals on a master sheet, means for analyzing data representing designations on said sheet and designations representing said signals, means controlled by said analyzing means upon the occurrence of one, or more than one and successive start signals to successively condition the start control means of the related recording machines operable, code translating and code converting means for each recording machine controlled by the related start control means to render the recording instrumentalities of the related recording means responsive to analyzed data to record data in a different code than the subsequently analyzed data representing designations, and further means controlled by said analyzing means upon the occurrence of a stop signal following the data representing designations to condition the related stop control means operable to render the code translating and converting means unresponsive to further analyzed data representing designations on said master sheet.

21. In a card punching system, the combination of a plurality of tape controlled card punching machines capable of punching data on cards in one code, tape sensing means for sensing data representing designations arranged according to another code, certain of said designations performing the function of selecting a related card punching machine for a card punching operation by initiating it into operation and then suppressing its operation, said certain designations demarcating said data representing designations, translating and code converting means intermediate said tape sensing means and said card punching machines responsive to all of said designations occurring on the tape, and means controlled by said sensing means upon sensing a special coded designation on said tape for conditioning the control of said code converting means over said card punching machine when responsive to said certain designations to prevent the operation of the selected card punching machine to punch a card to correspond with the certain designations sensed.

22. In a card punching system, the combination of a plurality of tape controlled punching machines capable of punching data on cards in one code, tape sensing means for sensing data representing designations arranged according to another code, certain of said designations performing the function of selecting a related card punching machine for operation by initiating it into operation and then suppressing its operation, said certain designations demarcating said data representing designations, a translating and code converting means intermediate said tape sensing means and said card punching machine responsive to all of said designations occurring on the tape, means controlled by said sensing means upon sensing a special coded designation on said tape to prevent the operation of the selected card punching machine under control of said translating and code converting means when said certain designations are sensed, start and stop punching control means for each card punching machine, and means operable through the part of the code translating and converting means which is responsive to said certain designations for rendering said start and stop punching control means operable as they occur on and are sensed on the tape.

23. In a card punching system, the combination of a plurality of tape controlled punching machines capable of punching data on cards in one code, tape sensing means for sensing data representing designations arranged according to another code, certain of said designations performing the function of selecting a related card punching machine for operation by initiating it into operation and then suppressing its operation, said certain designations demarcating said data representing designations, translating and code converting means intermediate said tape sensing means responsive to all of said designations occurring on the tape, and means controlled by said sensing means upon sensing a special coded designation thereon for preventing the operation of the selected card punching machine under control of said translating and code converting means to perforate a card column to represent said certain designations, and for conditioning said translating and code converting means to function as the initiating or suppressing means for the selected card punching machine upon response to said certain designations.

24. In a card punching system, the combination of a card punching machine, tape sensing means for sensing alphabetical and numerical data representing designations, and "figures" or "letters" designation on a tape, code translating and converting means intermediate said tape sensing means and said card punching machine, means responsive to the sensing of said "figures" or "letters" designation on the tape to condition said code translating and converting means to cause the punching machine to punch a card according to a numerical or alphabetical code, respectively, means responsive to the sensing of a "figures" designation to condition the code translating and converting means to prevent card punching when responsive to distinctive "start" and "stop" punching alphabetical designations, and "start" punching and "stop" punching control means operable through said translating and converting means in response to the receipt of such "start" and "stop" punching alphabetical designations to initiate or suppress the operation of said punching machine, respectively.

25. In a card punching system, the combination of a card punching machine, tape sensing means for sensing alphabetical and numerical data representing designations, and "figures" or "letters" designation on a tape, code translating and converting means intermediate said tape sensing means and said card punching machine, means responsive to the sensing of said "figures" or "letters" designation on the tape to condition said code translating and converting means to cause the punching machine to punch a card according to a numerical or alphabetical code, respectively, and means responsive to the sensing of a "figures" designation to condition the code converting and translating means to prevent card punching when responsive to distinctive "start" and "stop" punching alphabetical designations.

26. In a card punching system, the combination of a card punching machine, tape sensing means for sensing alphabetical and numerical data representing designations, and "figures" or "letters" designation on a tape, code converting and translating means intermediate said tape sensing means and said card punching machine, means responsive to the sensing of said "figures" or "letters" designation on the tape to condition the code converting and translating means to cause the punching machine to punch a card according to a numerical code but when responsive to distinctive "start" and "stop" punching alphabetical designations prevent the operation of the card punching machine to represent such "start" and "stop" punching alphabetical designations.

27. In a card punching system, the combination of a card punching machine, tape sensing means for sensing "start" and "stop" punching designations, numerical data representing designations, and "figures" or "letters" designation on a tape, code converting and translating means intermediate said tape sensing means and said card punching machine, means responsive to the sensing of said "figures" or "letters" designation on the tape to condition said code converting and translating means to cause the punching machine to punch a card according to a numerical or alphabetical code, respectively, and means responsive to the sensing of a "figures" designation to condition the code converting and translating means to be responsive to distinctive "start" and "stop" punching designations and to prevent said code converting and translating means from being effective to cause the operation of the card punching machine to punch a card with a designation corresponding to the "start" and "stop" punching designations.

28. In a card punching system, the combination of a plurality of card punching machines, means for analyzing alphabetical data representing designations which include "start" and "stop" designations, numerical data representing designations, "figures" and "letters" designations on a tape, a plurality of code translating and converting means, one for each card punching machine and controlled by the aforesaid analyzing means, means responsive to the sensing of the "figures" designation to condition said plurality of code translating and converting means to cause the latter to control the related punching machine to punch numerical data on the card, additional means responsive to the sensing of "start" signals distinctive for each card punching machine and comprising selected alphabetical designations which follow said "figures" designation to cause the related translating and converting means to be responsive to the associated signals and to prevent the translating and converting means from causing the card punching operation of the related punching machine, means responsive to the sensing of the "letters" designation to condition the code translating and converting means associated with the selected punching machine to cause the code translating and converting means to control the related punching machine to punch alphabetical data on the card which follows the aforesaid "letters" designation, and to also be responsive for card punching to each of said distinctive "start" and "stop" punching alphabetical designations if they occur in the alphabetical data designations on the tape following the "letters" designation, and further means responsive to the sensing of "stop" signals distinctive for each punching machine comprising other selected alphabetical designations following said second "figures" designation to cause the translating and converting means associated with the related punching machine in operation to be responsive to the associated signal to suppress the operation of the related punching machine and to prevent the translating and converting means from causing the card punching operation of the related punching machine.

29. In a card punching system, the combination of a plurality of card punching machines, means for analyzing alphabetical data representing designations, numerical data representing designations, "figures" and "letters" designations on a tape, a plurality of code translating and converting means, one for each card punching machine and controlled by the aforesaid analyzing means, means responsive to the sensing of the "figures" designation to concurrently condition all of said code translating and converting means to cause the latter to control the related punching machine to punch numerical data on the card, additional means responsive to the sensing of "start" signals distinctive for each card punching machine which follow said "figures" designation to cause the related translating and converting means to be responsive to the associated signals to initiate the operation of the associated punching machine without enabling the translating and converting means to cause the card punching operation of the related punching machine for the "start" signal, means responsive to the sensing of the "letters" designation to condition the code translating and converting means associated with the selected punching machine to enable the code translating and converting means to control the related punching machine to punch alphabetical data on the card which follows the aforesaid "letters" designation, and further means responsive to the sensing of "stop" signals distinctive for each punching machine following said second "figures" designation to cause the translating and converting means associated with the related punching machine in operation to be responsive to the associated signal to suppress the operation of the related punching machine and to prevent the translating and converting means from causing the card punching operation of the related punching machine for the "stop" signal.

30. In a card punching system, the combination of a plurality of card punching machines, means for analyzing numerical data representing designations, "figures" and "start" and "stop" punching designations on a tape, a plurality of code translating and converting means, one for each card punching machine and controlled by the aforesaid analyzing means, means responsive to the sensing of the "figures" designation to concurrently condition said plurality of code translating and converting means to cause the latter to control the related punching machine to punch numerical data on the card, and means responsive to the sensing of "start" and "stop" punching designations distinctive for each card punching machine which follow said "figures" designation but demarcate said numerical data representing designations to cause the related translating and converting means to be responsive to the associated "start" and "stop" designations to respectively initiate and suppress the operation of the associated punching machine without enabling the translating and converting means to cause the card punching operation of the related punching machine for such received "start" and "stop" designations.

31. In a card punching system, the combination of a card punching machine, means for analyzing numerical data representing designations, "figures" and "start" and "stop" designations on a tape, code translating and converting means, for said card punching machine and controlled by the aforesaid analyzing means, means responsive to the sensing of the "figures" designation to condition said code translating and converting means to cause the latter to control the punching machine to punch numerical data on the card, and means responsive to the sensing of distinctive "start" and "stop" designations which follow said "figures" designation but demarcate said numerical data representing designations to cause said code translating and converting means to be responsive to the "start" and "stop" designations as received to respectively initiate and suppress the card punching operation without enabling the translating and converting means to be effective to cause the card punching operation of the related punching machine for such received "start" and "stop" designations.

32. In a card punching system, a plurality of card punching machines, tape sensing means for sensing coded designations representing card punching machine selecting designations which upon their occurrence initiate the operation of a related punching machine to punch a card corresponding to subsequent data sensed on the tape, and then suppress the operation of the selected punching machine, a program system and apparatus for selecting said card punching machines for operation comprising start and stop punching control means for each punching machine, means controlled by said sensing means upon occurrence and sensing of said punching machine selecting designations on the tape to cause the operation of the start punching control means of the selected card punching machine to initiate the operation thereof at an initial card column position or from other card column positions when said card punching machine is at rest, and for causing the operation of the stop punching control means for suppressing the final operation at a predetermined final card column position, means operable at such final card column position for normalizing the related punching machine to its initial column position, and means for preventing further tape sensing operations for sensing a following message on the tape until all card punching machines are normalized to the initial card column punching position.

33. In a card punching system, a plurality of card punching machines, means for sensing coded designations representing individually distinctive card punching machine selecting designations which upon their sensing initiate the operation of a related punching machine to punch a card corresponding to subsequent data sensed on a tape, and then suppress the operation of the selected punching machine, a program system and apparatus comprising start and stop punching control means for each punching machine, means controlled by said sensing means upon occurrence and sensing of said card punching machine selecting designations to cause the operation of the start punching control means of the selected card punching machines to initiate the operation thereof at an initial card column position, and for causing the operation of the stop punching control means for suppressing the final operation at a predetermined final card column position, means operable at such final card column position for normalizing each card punching machine to said initial card column position, and means for preventing further tape sensing operations for a following message on the tape until all card punching machines are at said initial card column punching position.

34. In a card punching system, a plurality of card punching machines, a tape sensing means for sensing coded designations representing numerical data, a program system and apparatus comprising start and stop punching control means for each punching machine and including means operable as said tape is sensed to cause the operation of the start punching control means of the card punching machines to initiate the operation thereof at an initial card column position under control of said tape sensing means for card punching of numerical data, and for causing the operation of the stop punching control means to suppress the final operation at a predetermined final card column position, means operable at such final card column position for normalizing the related punching machine to its initial column position, and means for preventing further tape sensing operations for a following message on the tape until all punching machines are at the initial card column punching position.

35. In a card punching system, the combination of means for sensing coded control designations, data representing designations of one class and other data representing designations of another class, arranged on a tape according to one code, a card punching machine for punching said data according to another code, code translating and converting means controlled by said sensing means for causing card punching operations of sensed data of either class according to said other code, means responsive to sensing of said control coded designations on the tape for conditioning the code translating and converting means to receive sensed data of one class to accordingly control said punching operations in said other code, and further means responsive to the sensing of said control coded designations for conditioning said code translating and converting means to be inoperable to cause card punching operations upon sensing of data representing designations of said other class which are utilized to initiate and suppress card punching operations.

36. A machine according to the preceding claim 35 wherein means is provided which is responsive to another control designation sensed prior to sensing of data representing designations of said other class to recondition said code translating and converting means to be operable to cause card punching operations upon sensing of data representing designations of said other class.

37. In a recording system, the combination of a plurality of card punching machines, means for sensing data representing designations on a tape and other designations consisting of start punching and stop punching signals distinctive for each machine, a start punching control means for rendering a punching machine operable to punch cards under control of said sensing means, and stop punching control means for each machine to suppress card punching operations under control of said sensing means, means controlled by said sensing means upon sensing said start punching designations as they occur on the tape before the data representing designations for selectively rendering the related start punching control means of the related punching machine operable, a plurality of said start punching control means being rendered operable in succession upon sensing in succession the respective start punching signals to thereby enable concurrent operation of the related punching machines, and other means controlled by said sensing means upon sensing said stop punching designations as they occur on the tape after the data representing designation for selectively rendering the related stop punching control means of the related punching machine operable to suppress card punching operations of the related machine, a plurality of said stop punching control means being rendered operable in succession upon sensing in succession the respective stop punching signals to thereby suppress card punching operations for a plurality of card punching machines.

38. In a programming system for card punching machines, the combination of a plurality of card punching machines, means for sensing groups of data representing designations, each group following one or more different start punching designations according to the number of card punching machines to be set in card punching operations for the group and followed by one or more still different stop punching designations according to the number of card punching machines to be suppressed in operation, or retained in operation for a following group of data representing designations, a start punching control means for each card punching machine for initiating card punching operations of the related punching machine under control of said sensing means, a stop punching control means for each card punching machine for suppressing card punching operations of the related punching machine, and means controlled by said sensing means for each start and stop control means for rendering each of the latter operable to perform its function in connection with the associated punching machine upon sensing of the start and stop punching designations as they occur on the tape.

39. In a programming system for card punching machines, the combination of a plurality of card punching machines, a start punching control means for each card punching machine for initiating data card punching operations for the related card punching machine, a stop punching control means for each card punching machine for suppressing data card punching operations for the related card punching machine, means for sensing data representing designations on a tape and means controlled thereby for causing the operation of the card punching machine initiated in operation to effect data card punching operations, and programming means operable as said tape is sensed for rendering the start punching control means for one or more card punching machines operable according to the number of card punching machines to perform data card punching operations for the following group of data representing designations, and for rendering the stop punching control means for the desired number of card punching machines to be suppressed or retained in operation, for the following group of data representing designations.

40. In a programming system for determining the selective operation of a plurality of card punching machines, means for sensing a group of data representing designations on a tape and means controlled thereby for causing card punching operations of the card punching machine which is rendered operable, and programming means for determining the selective operation of said card punching machines under control of said sensing means, said programming means including selective means operable prior to sensing each group of data representing designations to selectively render the desired number of card punching machines operable under control of said sensing means according to the number of card punching machines which are to perform data card punching operations under control of said sensing means for said group of data representing designations, and including further selective means operable upon completion of sensing said group of data representing designations for suppressing card punching operations for one or more card punching machines for the next following group of data representing designations.

41. A card perforating system for perforating a plurality of cards to represent coded data selected from a perforated master tape, comprising a plurality of card perforating means responsive to a card perforating programming means for perforating a plurality of cards in another code to represent the same data derived from the tape, and/or for perforating in said other code each card separately to represent isolated data derived from the tape.

42. A card perforating system for perforating a plurality of cards to represent coded data selected from a perforated master tape, comprising a plurality of card perforating means responsive to program determining data on the tape for perforating a plurality of cards in another code to represent the same data derived from the tape, and/or for perforating in said other code each card separately to represent isolated data derived from said tape.

43. A card perforating system for perforating a plurality of cards to represent coded data selected from a perforated master tape, comprising a plurality of card perforating means responsive to a card perforating programming means for perforating corresponding card fields of a plurality of cards in another code to represent the same data derived from the tape, and/or for perforating in said other code other fields of each card separately to represent isolated data derived from said tape.

44. A punching system comprising a tape sensing station having means for receiving and sensing a perforated record, at least two independent card perforating machines, each provided with card punches and operating means therefor controlled by said sensing means to record data on the card, means cooperating with said sensing means to cause the selective operation of one or both card perforating machines to record data on one or two cards, respectively, which corresponds to the data indicated by the sensed perforations, and means for feeding the perforated record to said tape sensing station to receive and sense succeeding perforations therein after each operation of the last named means and said card perforating machines.

45. In a selective recording machine, the combination of a plurality of structurally identical recording machines for recording on similar type of records, a tape controlled sensing unit including tape perforation tape sensing means, means controlled by said tape sensing means to operate recording instrumentalities of the selected machine to record data on the related record, and programming means operable to effect in a predetermined sequence the concomitant operation of both recording machines under control of said tape sensing means to record the same data in common fields of a plurality of records, and to selectively effect the operation of one of said machines to record under control of said sensing means on the second field of the associated record data derived from the tape while the other recording machine is at rest and to selectively effect the operation of the other of said machines under control of the tape sensing means to record still other data derived from the master sheet on the second field of the related record while the recording machine previously in operation is at rest.

46. In a selective recording machine, the combination of a plurality of structurally identical recording machines for recording on similar type of records, a master sheet sensing unit including perforation sensing means, means controlled by said sensing means to operate recording instrumentalities of the selected machine to record on the related record, and programming means operable to effect concomitant operation of both recording machines under control of said master sheet sensing means to record the same data in common fields of a plurality of records, and in a predetermined sequence to selectively effect the operation of one of said machines to record under control of said sensing means on the second field of the associated record data derived from the master sheet while the other recording machine is at rest, and to selectively effect the operation of the other of said machines under control of the master sheet sensing means to record still other data derived from the master sheet on the second field of the related record while the recording machine previously in operation is at rest.

47. In a selective recording machine, the combination of a plurality of structurally identical recording machines for recording similar type of records, a master sheet sensing unit including perforation sensing means, means controlled by said sensing means to operate recording instrumentalities of the selected machine to record on the related record therein column by column with concomitant column by column spacing of the record, and programming means operable to effect concomitant operation of both recording machines under control of said master sheet sensing means to record the same data in common fields of a plurality of records and effect concomitant column by column spacing of both records, and in a predetermined sequence to selectively effect the operation of one of said machines to record under control of said sensing means on the second field of the associated record with column by column spacing thereof while the other recording machine is at rest, and to selectively effect the operation of the other of said machines under control of the sensing means to record still other data derived from the master sheet on the second field of the related record with column by column spacing thereof while the recording machine previously in operation is at rest.

48. In a selective recording system, the combination of a plurality of structurally separate recording machines, each including instrumentalities to effect character recording operations, means for analyzing in succession groups of data on a master sheet and columns of data of each group in succession, means controlled by said analyzing means to select said recording instrumentalities for recording operations as the data of a group is analyzed, and programming means operable as said master sheet is sensed to effect the concomitant operation of both recording machines under control of said master sheet analyzing means for one group of master sheet data, or to effect the operation of a selected recording machine alone under control of said master sheet analyzing means for another group of master sheet data.

49. In a selective recording system, the combination of a plurality of structurally separate recording machines, each including instrumentalities to effect character recording operations, means for analyzing in succession groups of data on a master sheet and columns of data of each group in succession, means controlled by said analyzing means to select said recording instrumentalities for recording operations as the data of a group is analyzed, and programming means operable as said master sheet is sensed to effect the concomitant operation of both recording machines under control of said master sheet analyzing means for one group of master sheet data, and to then suppress the operation of one of said recording machines to enable the operation of the other of said recording machines under control of said master sheet analyzing means for another group of master sheet data.

50. In a selective recording system, the combination of a plurality of structurally separate recording machines, each including instrumentalities to effect character recording operations, means for analyzing in succession groups of data on a master sheet and columns of data of each group in succession, means controlled by said analyzing means to select said recording instruments for analyzing in succession groups of data of a group is analyzed, and programming means operable to selectively call either or both of said recording machines into operation under control of said master sheet data analyzing means, or to suppress the operation of one or both of said recording machines for another group of master sheet data.

CHARLES R. DOTY.

CERTIFICATE OF CORRECTION.

Patent No. 2,375,293.  May 8, 1945.

CHARLES R. DOTY.

It is hereby certified that error appears in the printed specification of the above numbered patent requiring correction as follows: Page 22, second column, line 4, strike out "means for analyzing in succession groups of data" and insert instead --mentalities for recording operations as the data--; and that the said Letters Patent should be read with this correction therein that the same may conform to the record of the case in the Patent Office.

Signed and sealed this 18th day of September, A. D. 1945.

Leslie Frazer
(Seal)   First Assistant Commissioner of Patents.

chines under control of said master sheet analyzing means for one group of master sheet data, and to then suppress the operation of one of said recording machines to enable the operation of the other of said recording machines under control of said master sheet analyzing means for another group of master sheet data.

50. In a selective recording system, the combination of a plurality of structurally separate recording machines, each including instrumentalities to effect character recording operations, means for analyzing in succession groups of data on a master sheet and columns of data of each group in succession, means controlled by said analyzing means to select said recording instrument means for analyzing in succession groups of data of a group is analyzed, and programming means operable to selectively call either or both of said recording machines into operation under control of said master sheet data analyzing means, or to suppress the operation of one or both of said recording machines for another group of master sheet data.

CHARLES R. DOTY.

CERTIFICATE OF CORRECTION.

Patent No. 2,375,293.

May 8, 1945.

CHARLES R. DOTY.

It is hereby certified that error appears in the printed specification of the above numbered patent requiring correction as follows: Page 22, second column, line 4, strike out "means for analyzing in succession groups of data" and insert instead --mentalities for recording operations as the data--; and that the said Letters Patent should be read with this correction therein that the same may conform to the record of the case in the Patent Office.

Signed and sealed this 18th day of September, A. D. 1945.

Leslie Frazer
(Seal)          First Assistant Commissioner of Patents.